W. G. WHITE.
JUSTIFYING TYPE WRITER.
APPLICATION FILED APR. 22, 1907.

943,502.

Patented Dec. 14, 1909.
19 SHEETS—SHEET 1.

Witnesses

Inventor

Attorney

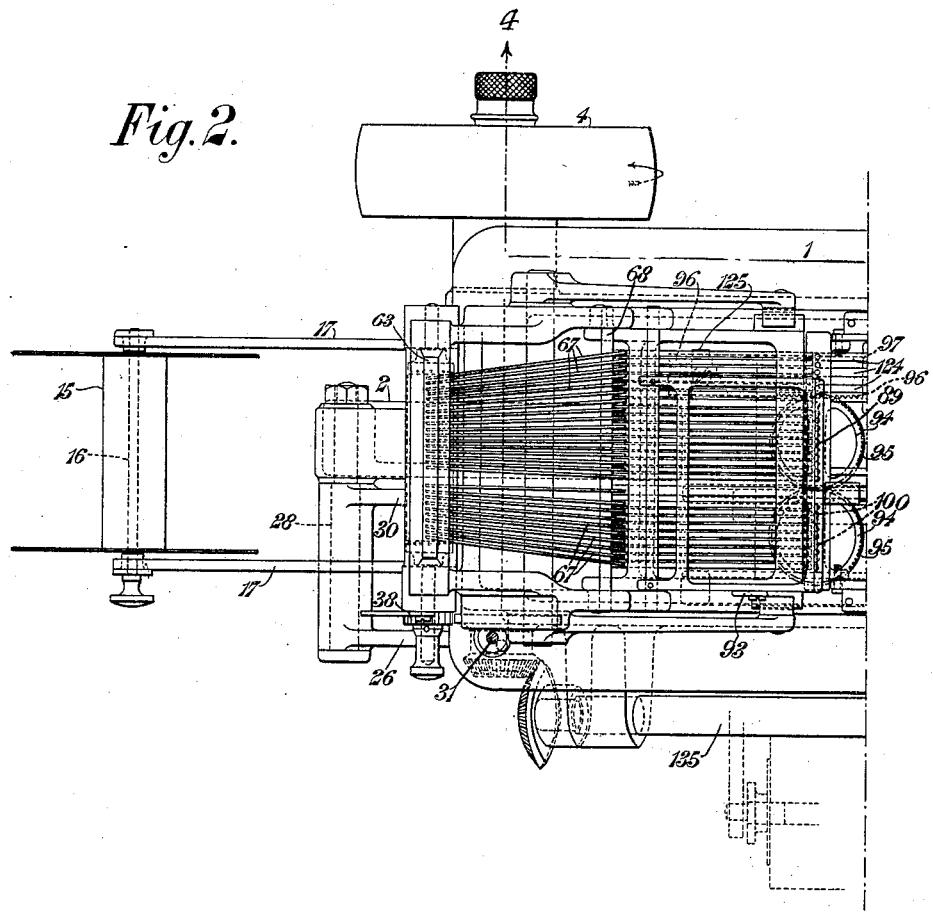

W. G. WHITE.
JUSTIFYING TYPE WRITER.
APPLICATION FILED APR. 22, 1907.
943,502.
Patented Dec. 14, 1909.
19 SHEETS—SHEET 3.
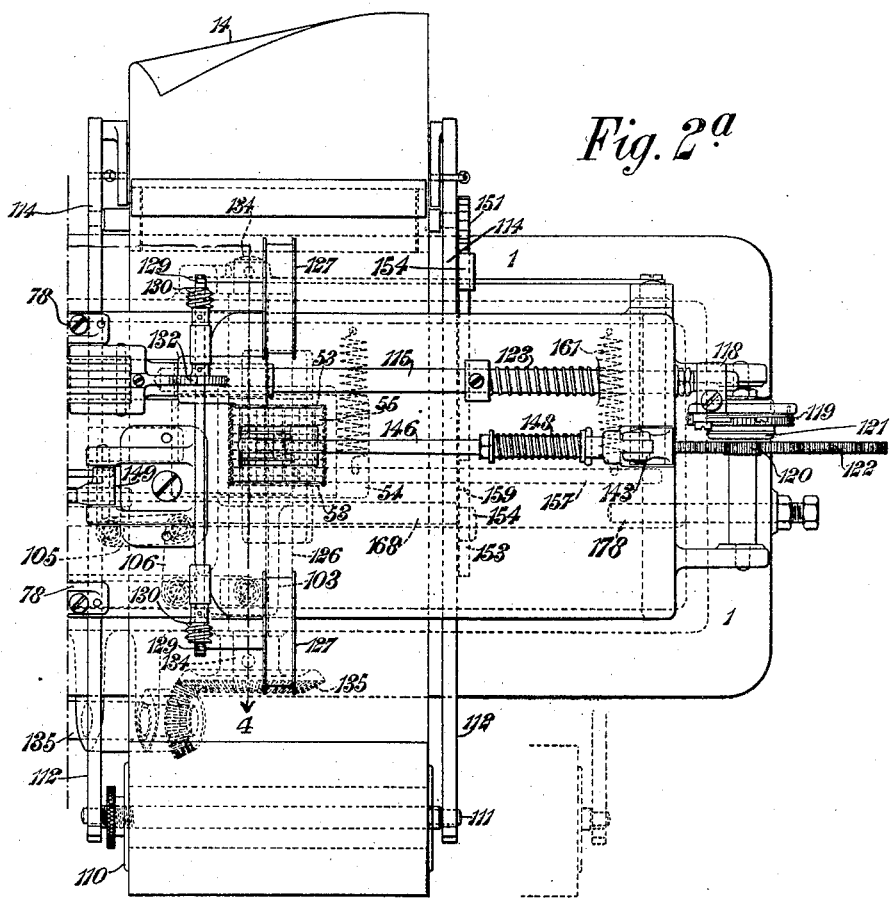
Fig. 2ª
Witnesses
L. A. Clemo.
J. J. Blaker.
Woolman Gibson White
Inventor
per Chas. S. Woodroffe,
Attorney

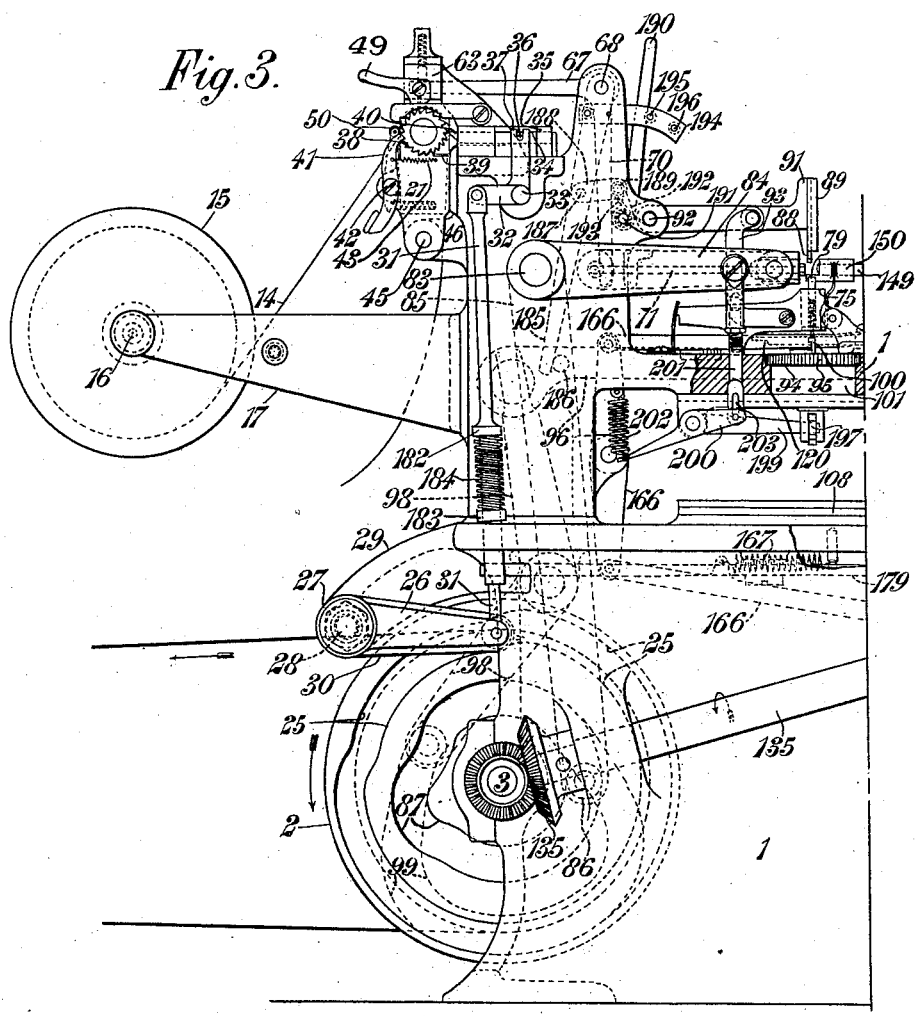

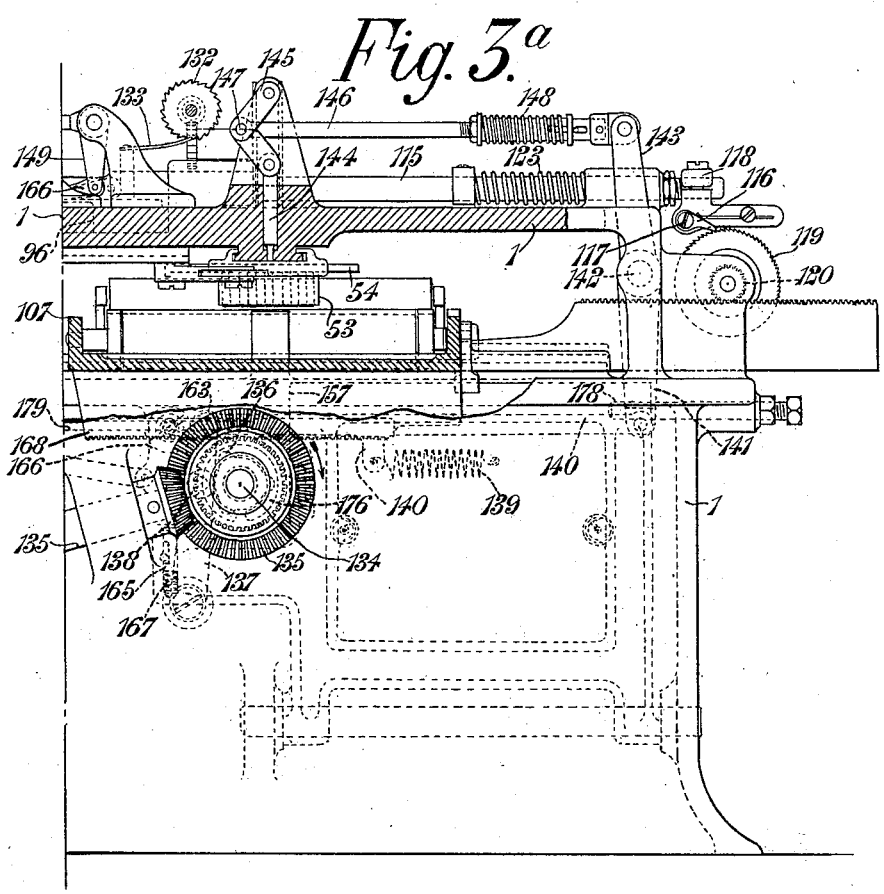

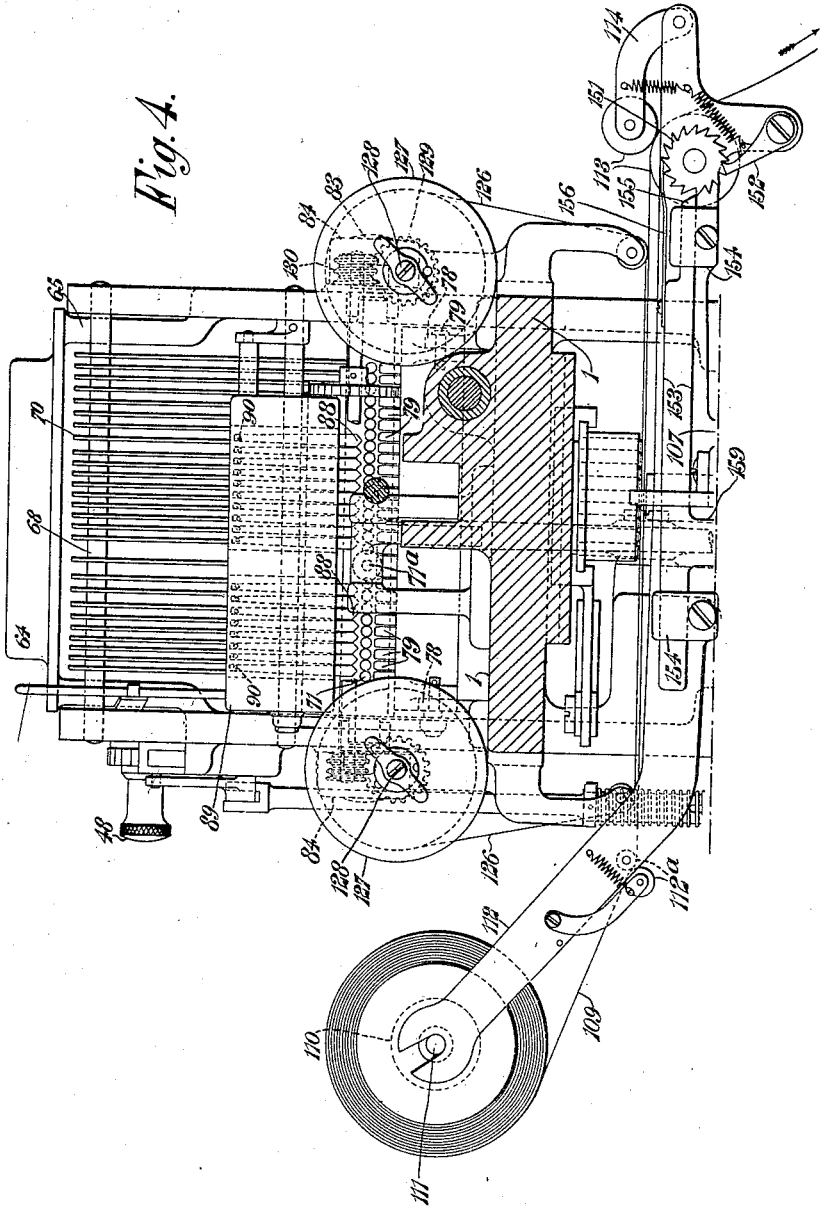

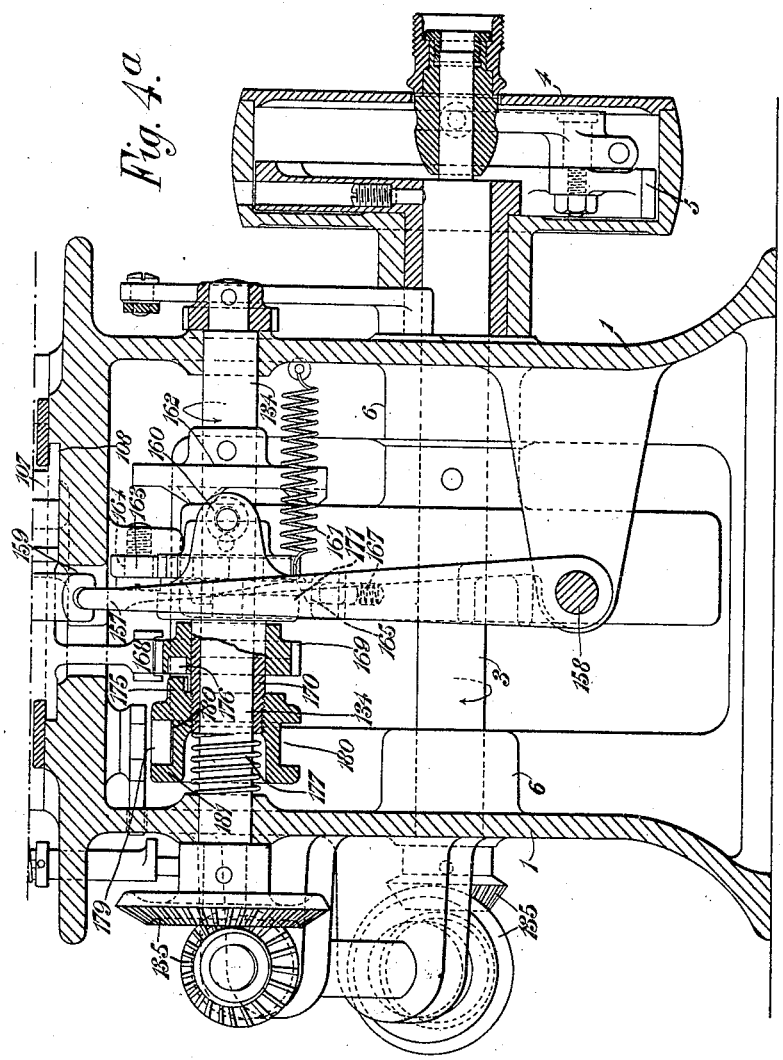

W. G. WHITE.
JUSTIFYING TYPE WRITER.
APPLICATION FILED APR. 22, 1907.
943,502.
Patented Dec. 14, 1909.
19 SHEETS—SHEET 8.
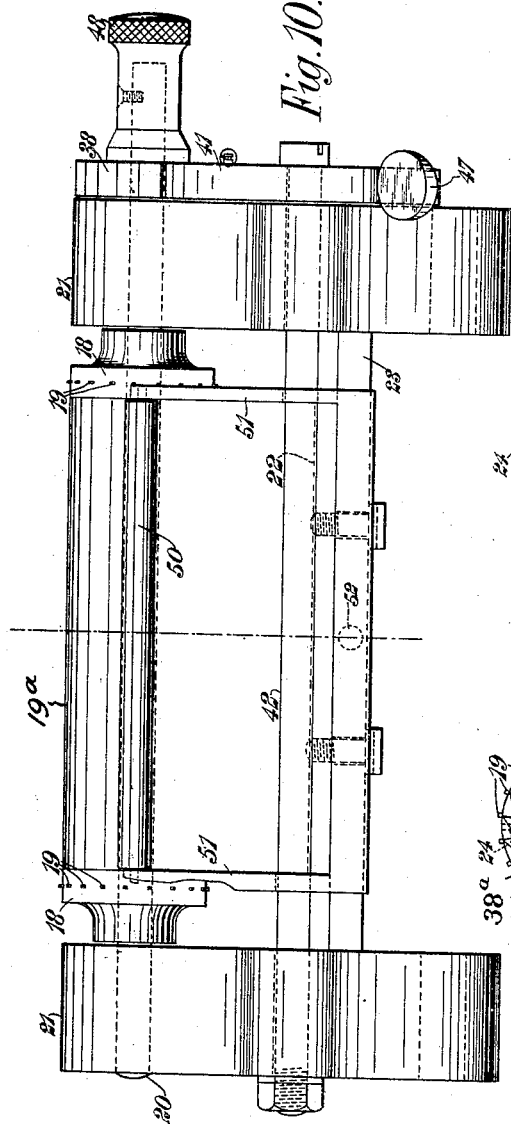
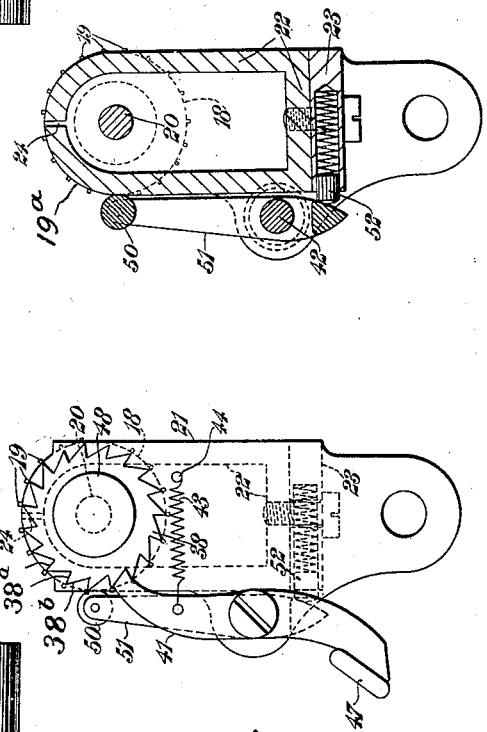
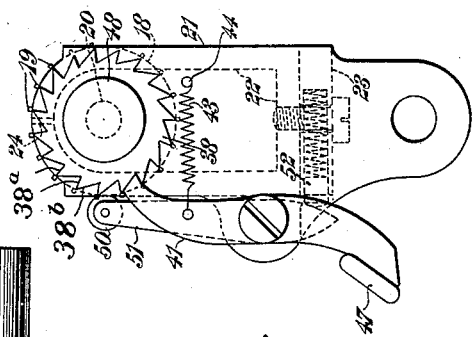

W. G. WHITE.
JUSTIFYING TYPE WRITER.
APPLICATION FILED APR. 22, 1907.

943,502.

Patented Dec. 14, 1909.
19 SHEETS—SHEET 9.

Witnesses
F. A. Clemo.
J. J. Baker.

Woolman Gibson White Inventor
per Edgar S. Woodroffe,
Attorney

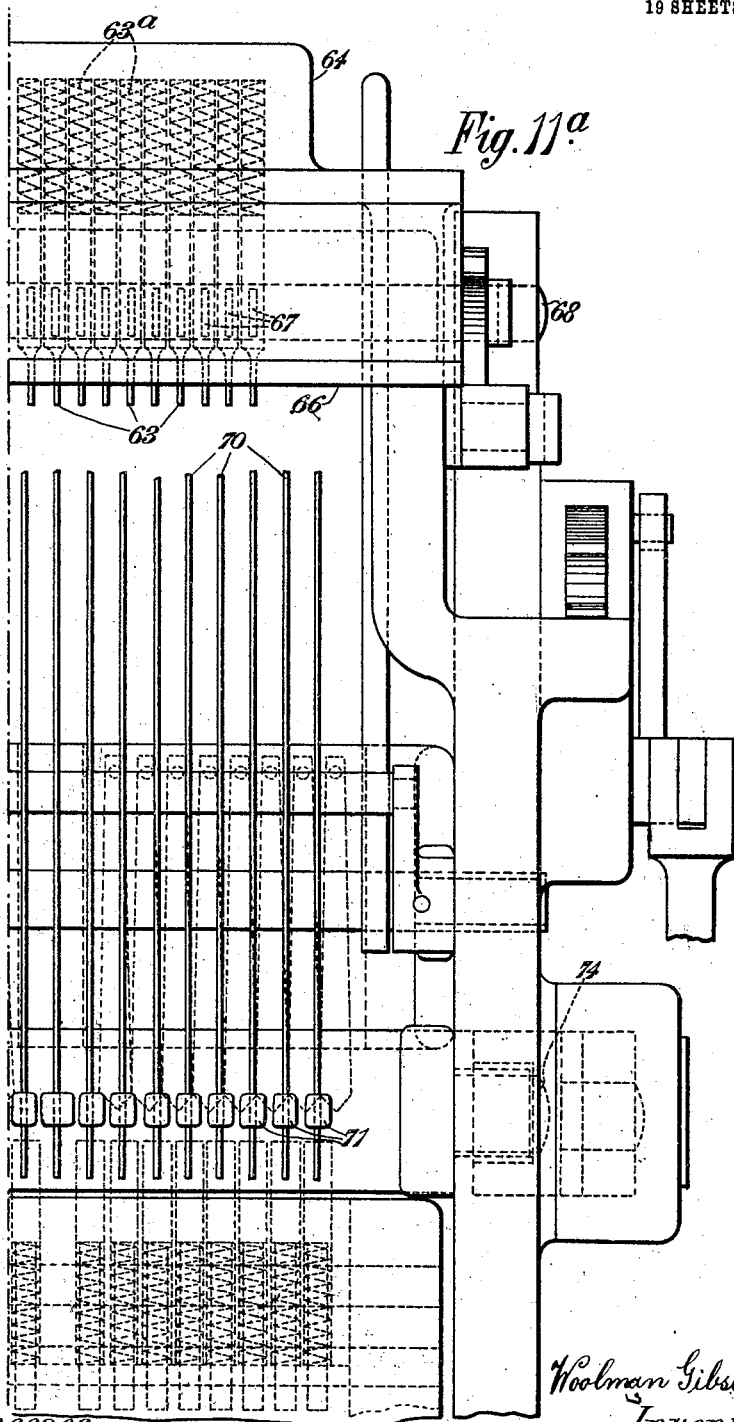

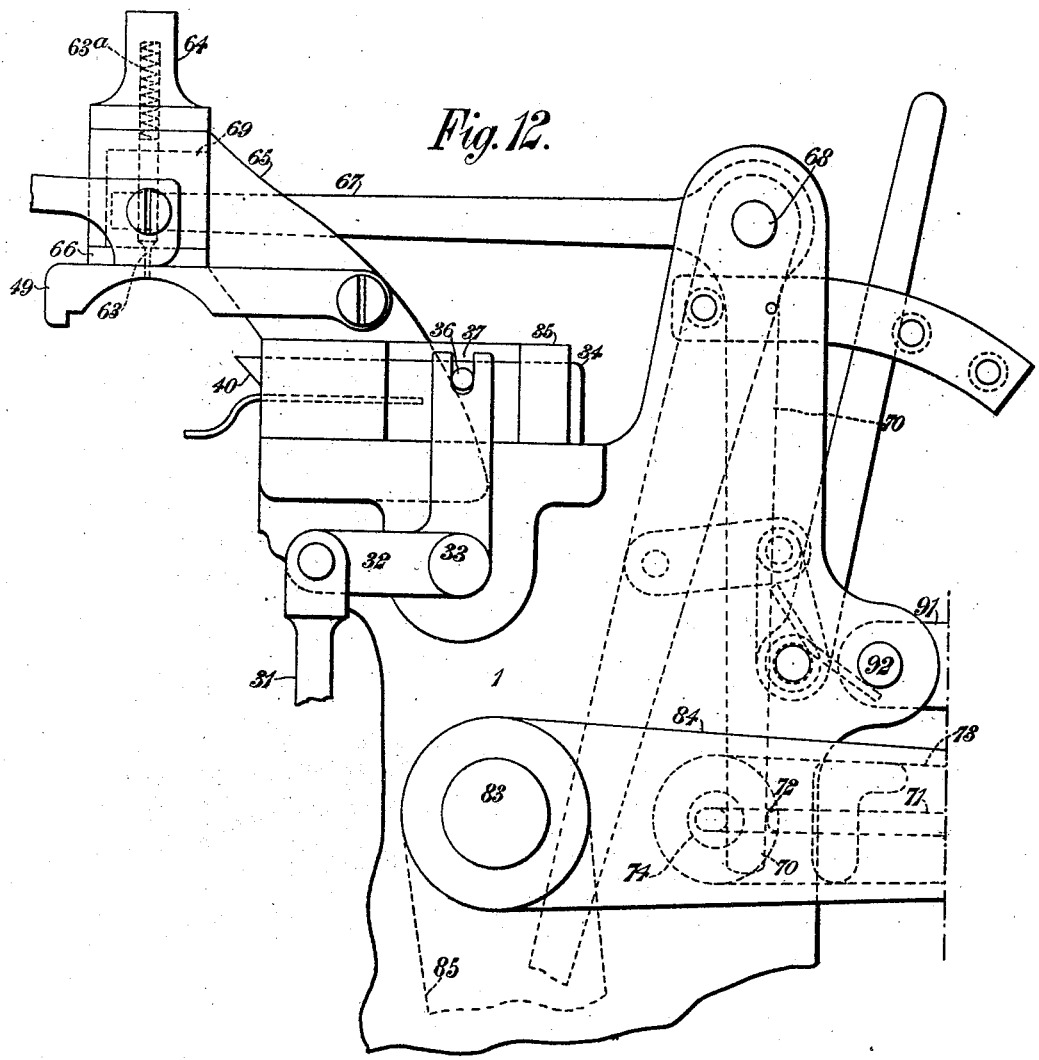

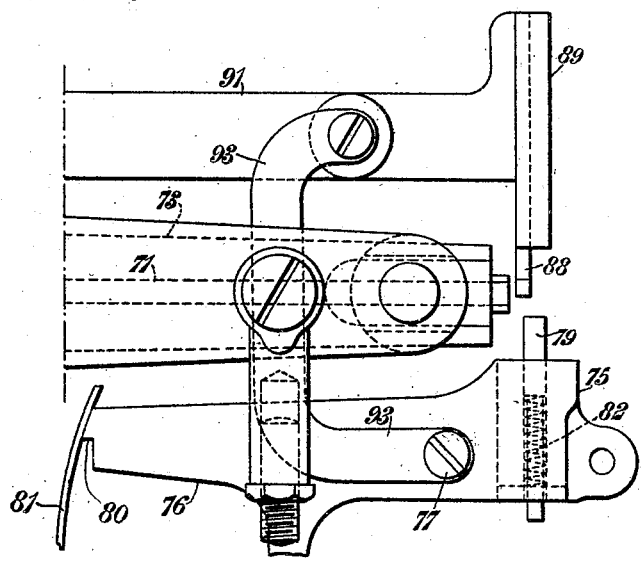
Fig. 12.ᵃ
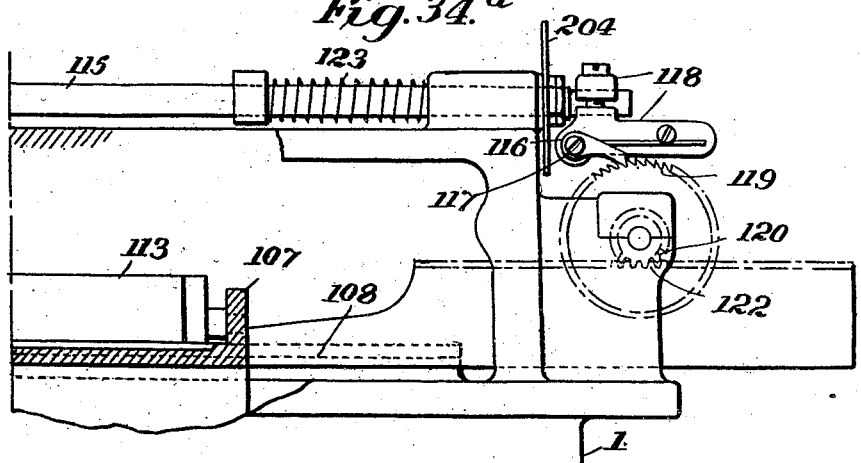
Fig. 34.ᵃ

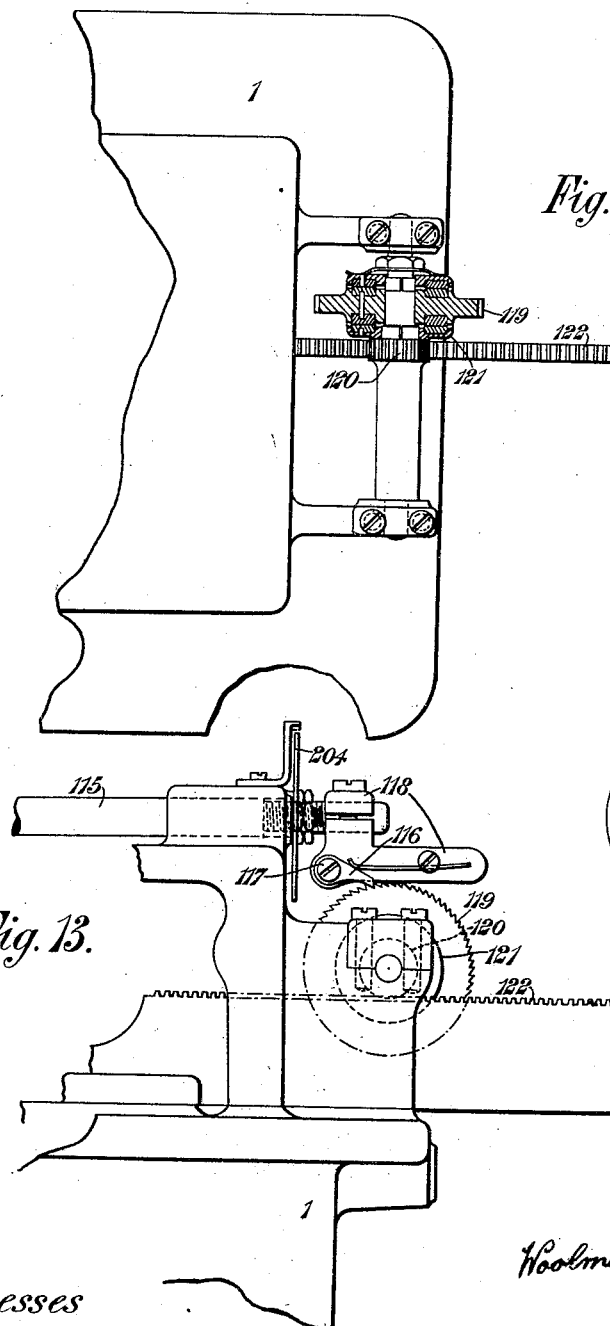

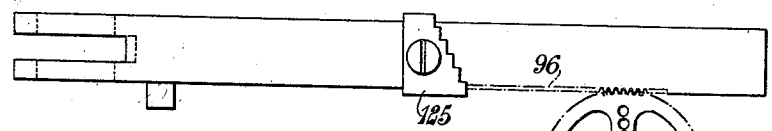
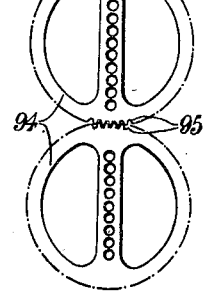
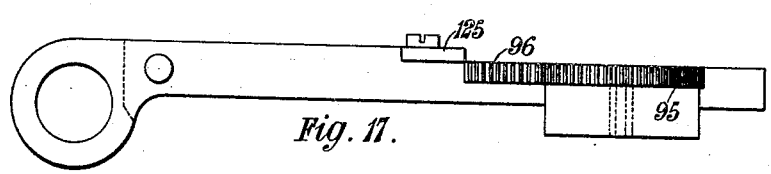
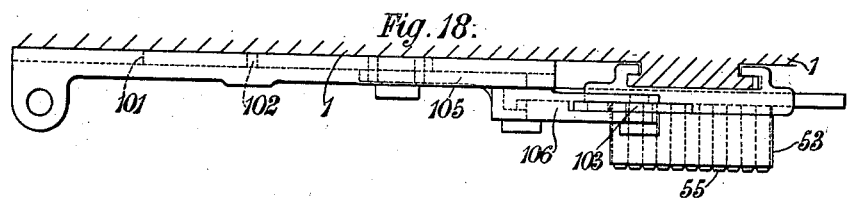
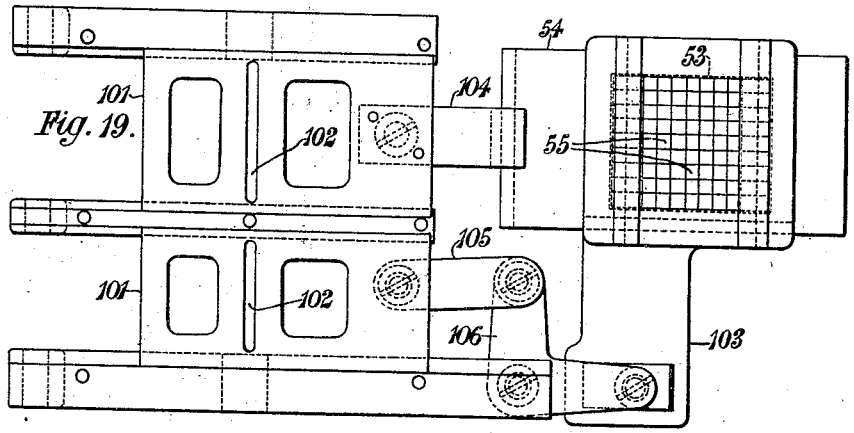

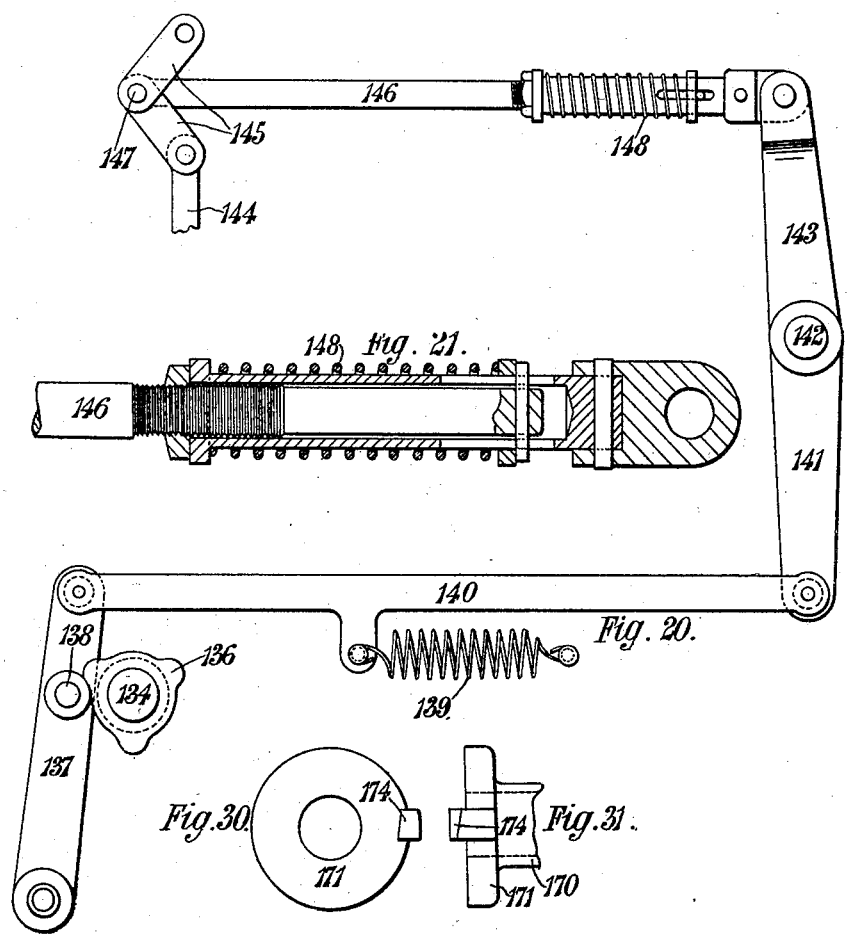

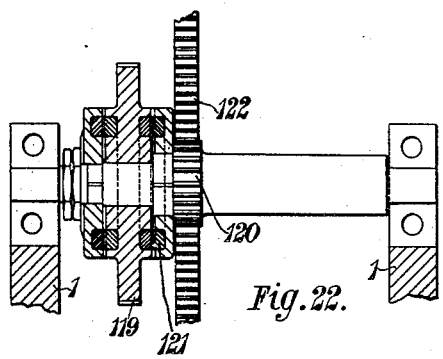
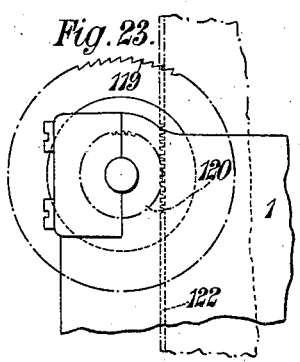
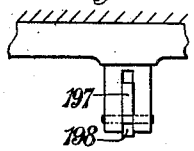
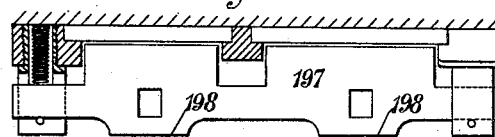
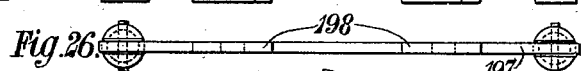
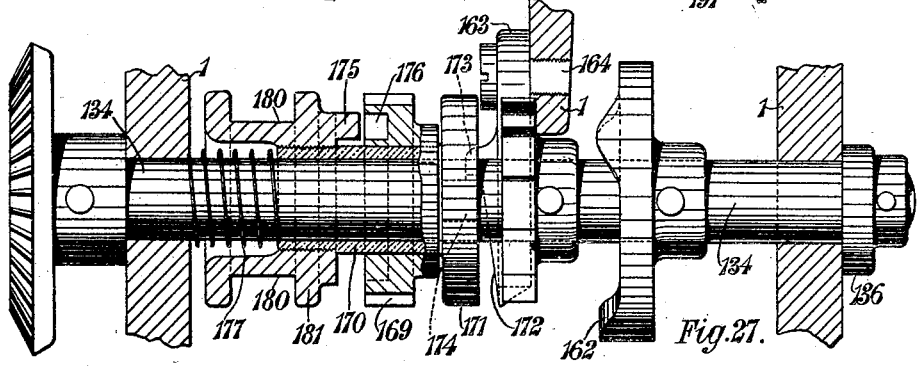
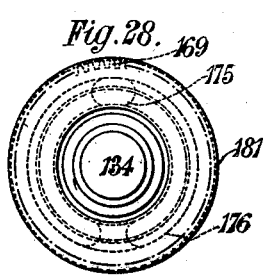
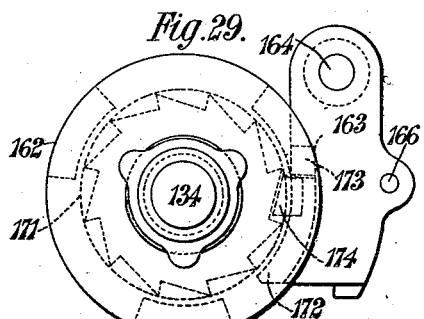

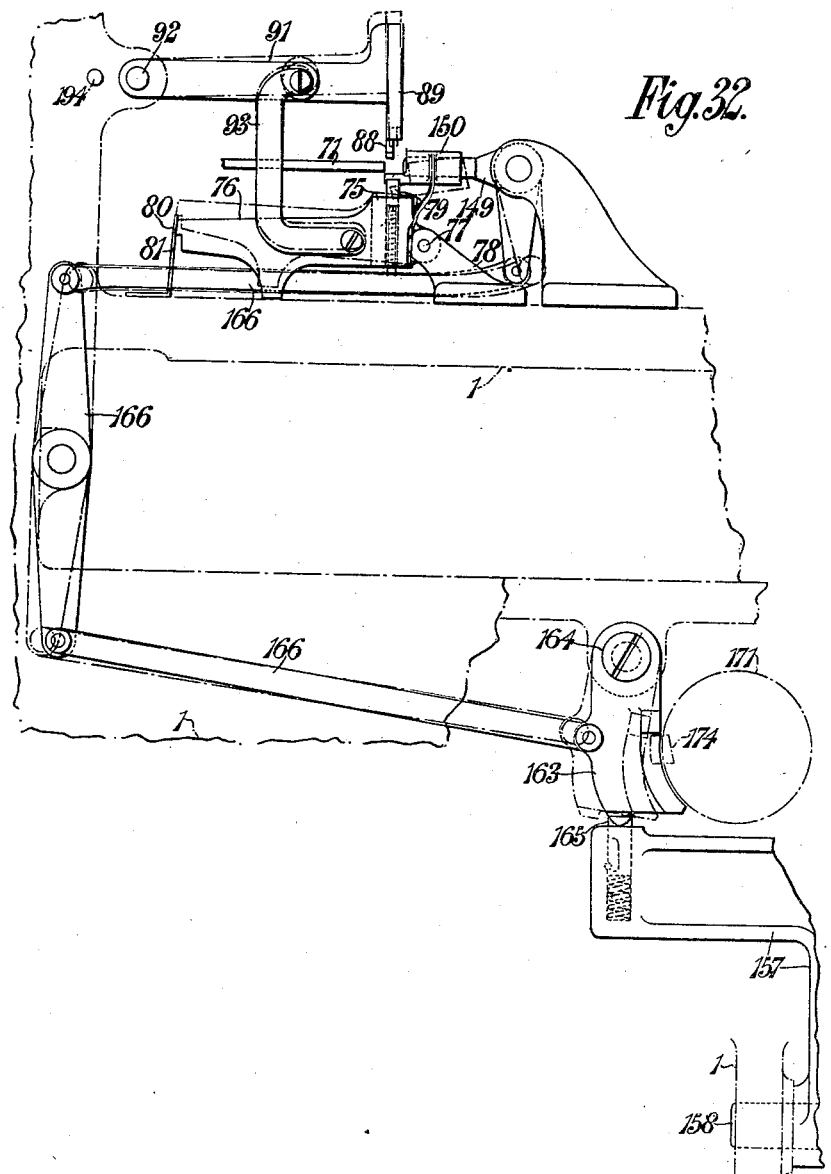

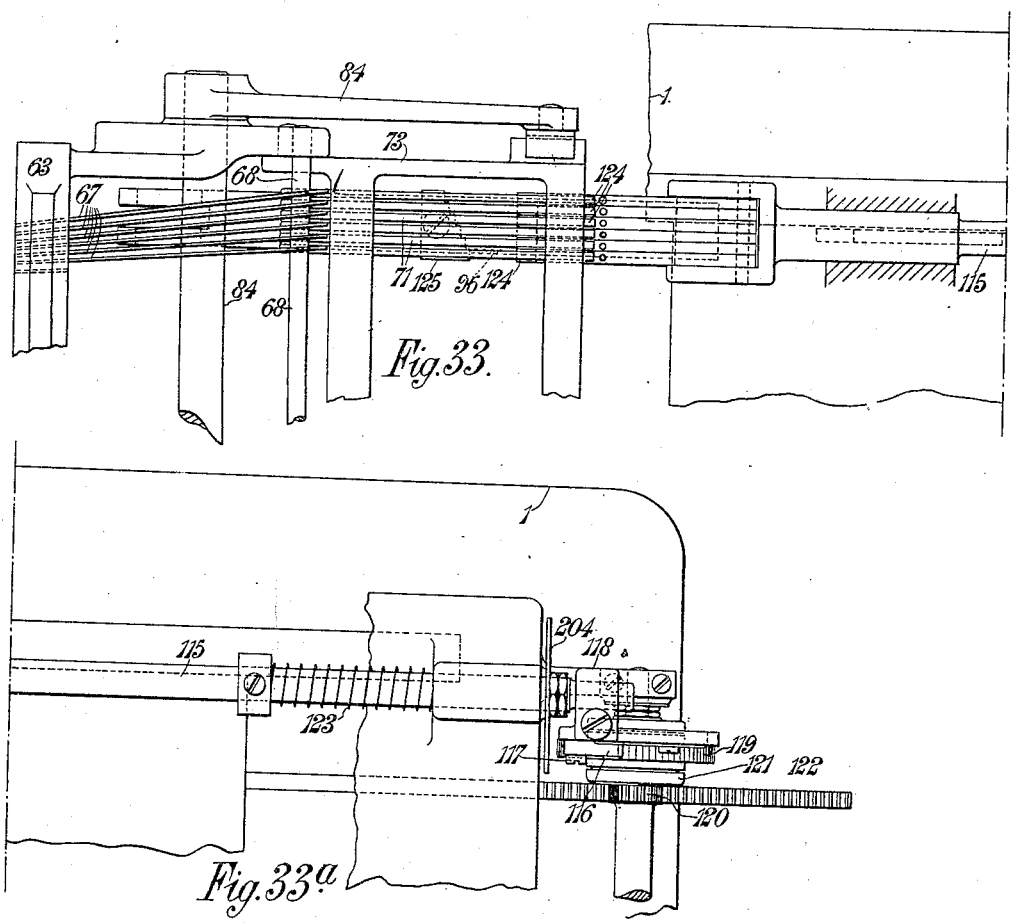

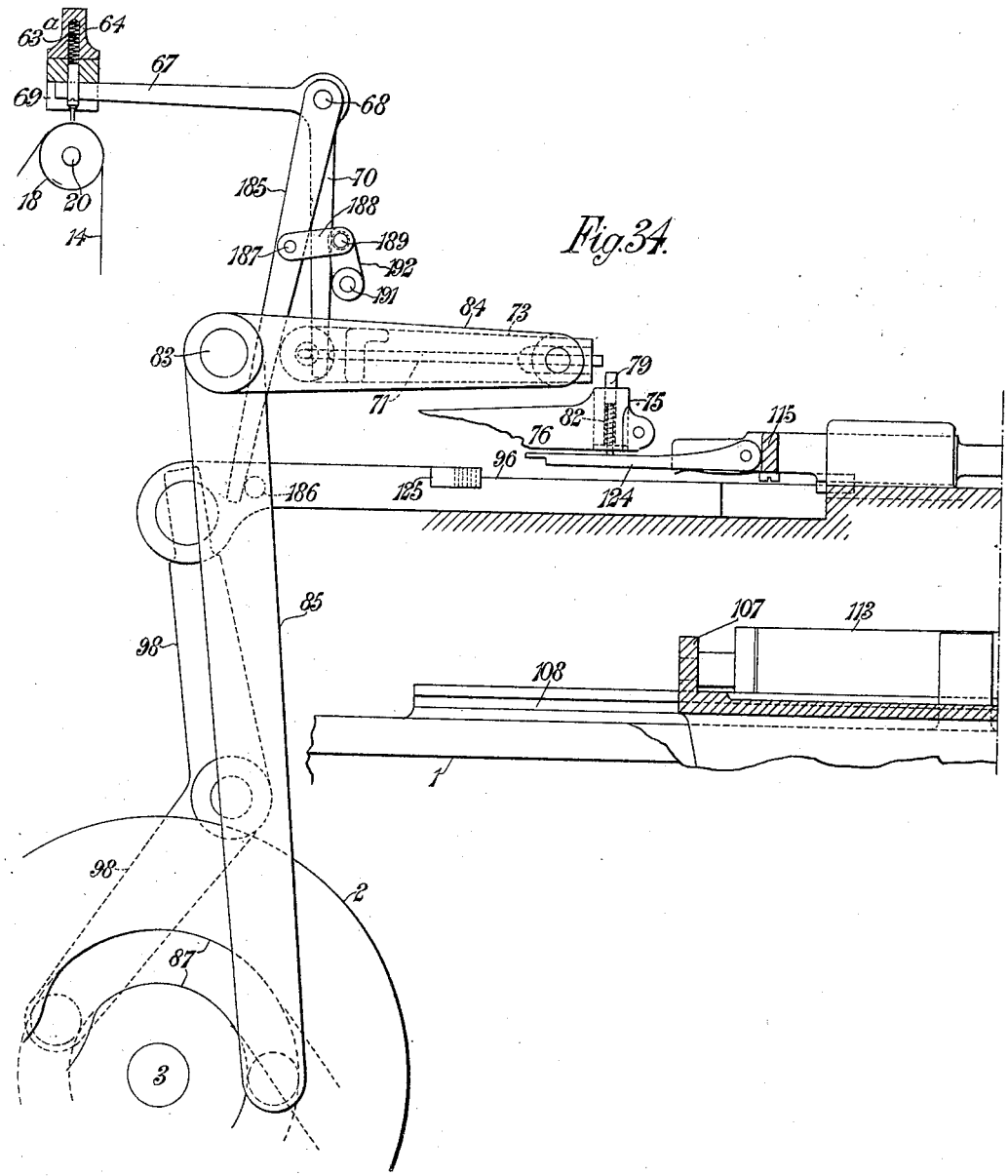

UNITED STATES PATENT OFFICE.

WOOLMAN GIBSON WHITE, OF WASHINGTON, DISTRICT OF COLUMBIA, ASSIGNOR TO LINOTYPE AND MACHINERY LIMITED, OF LONDON, ENGLAND.

JUSTIFYING TYPE-WRITER.

943,502.  Specification of Letters Patent.  Patented Dec. 14, 1909.

Application filed April 22, 1907.  Serial No. 369,541.

*To all whom it may concern:*

Be it known that I, WOOLMAN GIBSON WHITE, a citizen of the United States of America, residing at 503 B street northeast, Washington, District of Columbia, United States of America, have invented certain new and useful Improvements in Justifying Type-Writers, of which the following is a specification.

The present invention relates to improvements in justifying typewriters, and the object of it is to produce a high speed, power driven, automatic machine adapted by being under the control of a perforated strip known in the art as a mechanical controller, to produce columns or pages of typed matter the lines of which are properly justified at both ends.

Any of the mechanical controllers known at the present time may be used for the purposes of the present invention; the one described in the specification of Letters Patent 536149, March 19th, 1895, granted to Frank Amos Johnson, is preferred to any other.

A machine embodying the features of the present invention is illustrated in the accompanying drawings, and the invention will be described with reference thereto, the various features of novelty being pointed out in the appended claims.

Figure 1:
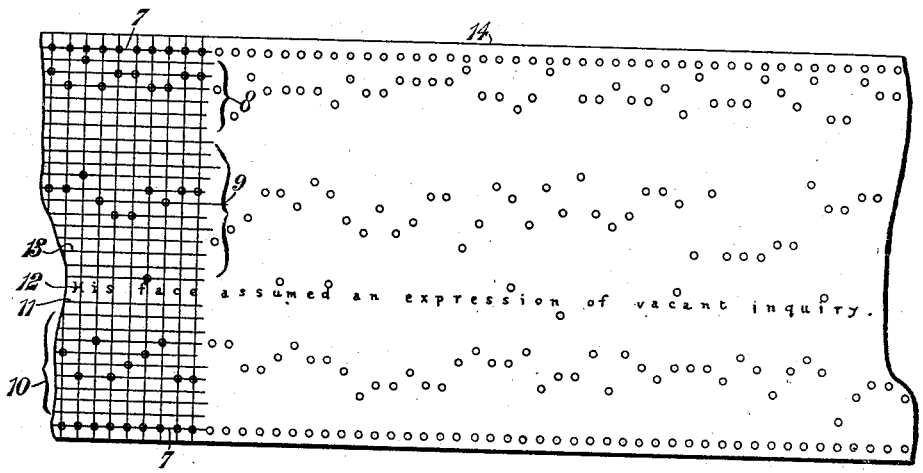
Figure 5:
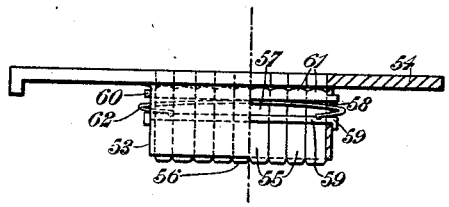
Figure 6:
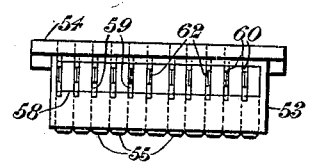
Figure 7:
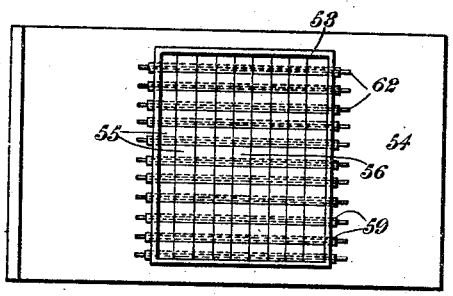
Figure 11:
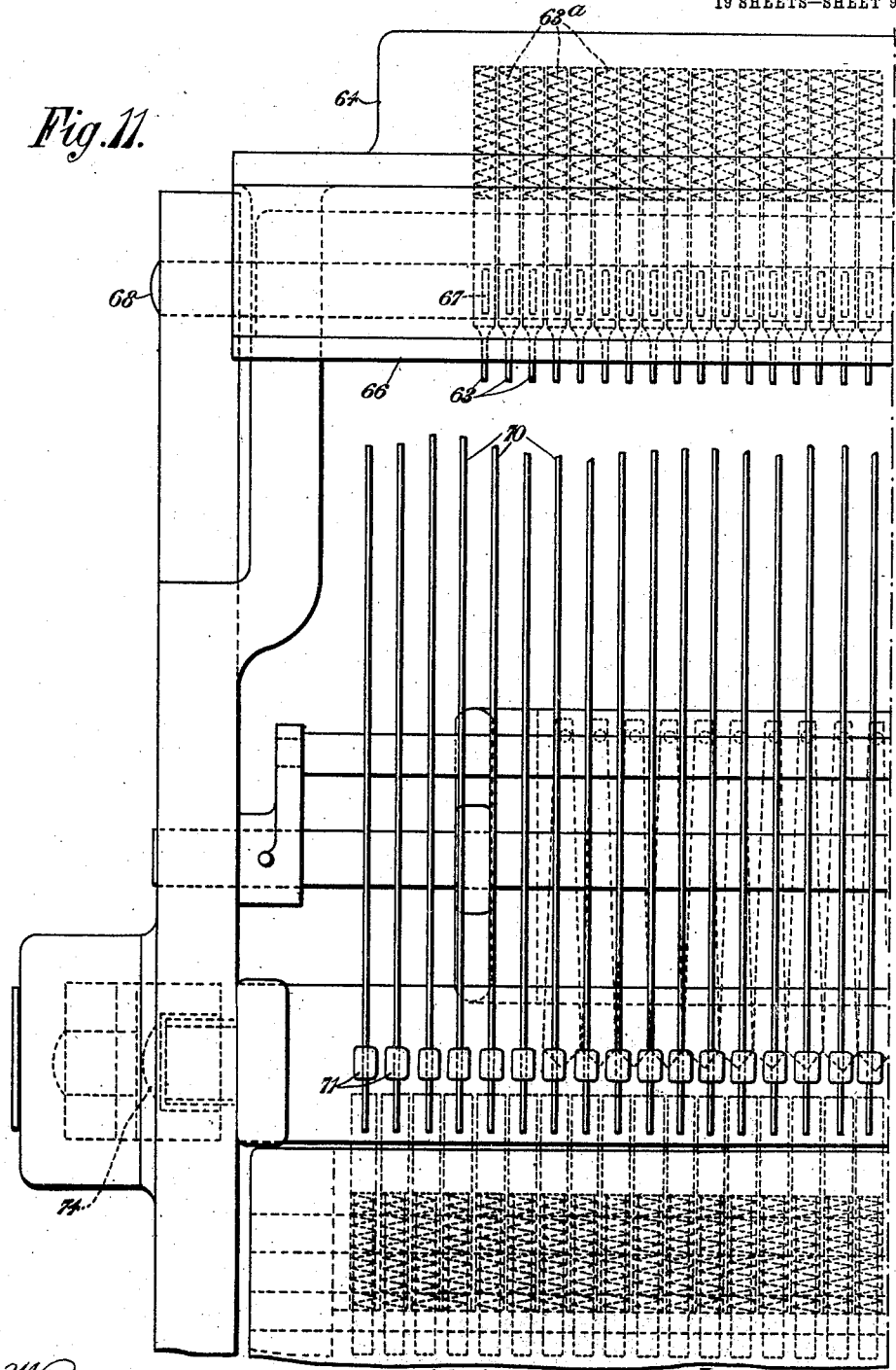

Figure 1 is a plan of a portion of the preferred mechanical controller; Figs. 2 and 2ª are respectively the left and right hand halves of a plan of the machine, omitting the controller; Figs. 3 and 3ª are respectively the left and right hand halves of a side elevation thereof, partly in section, looking at Fig. 2 in the direction of the arrow, and with the controller in place; Figs. 4 and 4ª are respectively the upper and lower halves of a transverse sectional elevation of the machine, approximately on the line 4—4 of Figs. 2 and 2ª, and drawn to an enlarged scale; Fig. 5 is a side elevation, partly in section, of the type carrier; Fig. 6 is a front elevation and Fig. 7 an inverted plan thereof; Fig. 8 is a sectional elevation, Fig. 9 an end elevation and Fig. 10 a front elevation, all detached, illustrating the controller feed; Figs. 11 and 11ª are respectively the left and right hand halves of a rear elevation and Figs. 12 and 12ª respectively the left and right hand halves of a side elevation of the type selecting mechanism; Fig. 13 is a sectional elevation and Fig. 14 an end elevation of the carriage feed mechanism; Fig. 15 is a detached view of a detail of the carriage feed mechanism; Fig. 16 is a plan and Fig. 17 a side elevation of the coördinate wheels and the rack which operates them; Fig. 18 is a side elevation and Fig. 19 a plan of the mechanism which moves the typecase; Fig. 20 is a side elevation on an enlarged scale of the type impressing mechanism; Fig. 21 is a sectional elevation of a detail of the same; Fig. 22 is a plan, partly in section, and Fig. 23 a side elevation of part of the carriage feed mechanism; Fig. 24 is an end elevation, Fig. 25 a side elevation and Fig. 26 an inverted plan of the bar which disengages the wheel pins from the slides; Fig. 27 is an elevation of the cam shaft and the cams thereon; Fig. 28 is an end view of the same from the left-hand end with the miter wheel removed; Fig. 29 is an end view of the same from the right-hand end; Figs. 30 and 31 are respectively an end and side elevation of a detail; Fig. 32 is a side elevation on an enlarged scale of the link-and-lever device 166; Figs. 33 and 33ª together form a plan of the justification mechanism, and Figs. 34 and 34ª together form a side elevation of the same.

*Machine frame, driving and cam shaft, and driving clutch.* (Figs. 2, 3 and 4.)— The operative parts of the machine are supported upon and in a frame 1 of any suitable construction, the moving parts being driven from a composite cam 2 fast upon one end of a shaft 3, the opposite end of which carries the driving pulley 4 and the driving clutch 5 which acts between it and the said shaft. The latter is thus both driving shaft and cam shaft. It turns in suitable bearings 6, 6 on the sides of the frame 1 and makes one rotation for each character. The clutch 5 is of a well known kind and for that reason no detailed description of it is necessary.

*Controller.* (Figs. 1 and 3.)—The holes are distributed among twenty-nine rows represented by twenty-nine of the thirty horizontal lines shown on the left hand of Fig. 1, and transverse rows represented by the vertical lines shown in the same place. These lines are imaginary and are presented only to assist the reader in tracing the distribution of the holes and in identifying the different classes of holes.

7, 7 are the two rows of feeding holes, one along each side margin; 8, the six rows of holes that regulate the spaces between the printed characters; 9 the eleven rows and 10 the nine rows that regulate, through the arcual motions of two wheels (hereinafter described), the two motions of the type carrier which, merged into one motion, result in the presentation of the selected character in the printing position; and 11, the one row that shifts the paper carriage at the end of each line to its initial position.

12 is the printed interpretation of the rows 9 and 10; and 13 is a line upon which there are no holes.

The operative parts of the machine are all under the control of the controller 14. This latter is shown in the operative position in Fig. 3, where it is marked with its reference (14). It is wound upon a reel 15 that is carried by, and can turn freely upon, a spindle 16 passed through the outer ends of the arms 17 which are fast to and project from the rear end of the frame 1. These arms stand at a suitable distance apart to receive the reel 15 and project far enough to the rear to make the controller 14 clear the end of the machine, as it passes to the controller feeder. The spindle 16 is detachable from the arms 17 to provide for the substitution of a full reel for an empty one.

*Controller feeder.* (Figs. 3 and 8 to 10.)—The function of the controller feeder is to give to the controller a step by step motion, stopping as soon as a transverse row of holes is presented to the row of selecting pins presently to be described. Said feeder consists essentially of a pair of disks 18, 18 of the same diameter and having feeding pins 19 projecting radially from their peripheries, and their axle 20 to which they are fast. As these disks are required to engage in the feeding holes 7 of the controller 14, they are all of the same size and projection, and those on one disk are exactly opposite those on the other and are separated from each other by the same distance that separates the holes 7 from each other. The distance between the two disks 18, 18 is enough to receive the controller 14 easily. The axle 20 turns freely in bearings in the cheeks 21, 21 of the feeder frame.

A fixed convex surface 19$^a$ extends from one disk 18 to the other for the controller 14 to travel over and to be supported on with reference to the selecting pins described further on. This surface is shown as provided with a metal plate 22 screwed down upon a tie bar 23 extending from one cheek 21 to the other, and bent upward before and behind and then forward and backward to the curve of the upper portions of the disks 18 till its two edges nearly meet, leaving a slot 24 wide enough for the selecting pins to pass through. If preferred, a solid block may be substituted for the bent plate 22, or holes for the slot 24. The selecting pins drop about a quarter of an inch below the convex surface.

The axle 20 receives a step by step rotary motion from the cam grooves 25 in the cam 2, an arm 26 engaging by one end in the said groove and fast by the other to a sleeve 27 turning on a shaft 28 carried by a bracket 29 fast to the machine frame 1 and projecting to the rear from it, a second arm 30 fast to the sleeve 27 and projecting to the front therefrom, a push rod 31 pivotally connected by its bottom end to the front end of the arm 30, a bell crank lever 32 turning on a fulcrum 33 in the machine frame 1 and having one arm pivotally connected by its outer end to the top of the push rod 31, a slide 34 adapted to work in a suitable guide 35 upon the frame 1 under the control of the bell crank lever 32 to which it is connected by a stud 36 fast to it and engaging in a slot 37 in the outer end of the other arm of the said lever 32, a ratchet wheel 38 fast on the respective end of the axle 20 and having the same pitch as the disks 18, a spring push 39 and a rigid push 40 on the rear end of the slide 34, together adapted to turn the wheel 38 for the distance of one tooth. The teeth of the wheel 38 have abrupt front faces 38$^a$ and oblique rear faces 38$^b$ and as said wheel turns the front faces of its teeth lead. This wheel is turned step by step by the combined action of two pushes 39 and 40 acting alternately against the back faces 38$^b$ of its teeth. First the push 39 engages with the back of a tooth, and then the push 40 by its inclined bottom with the back of a following tooth. The respective lengths of the protruding portions of the two pushes 39 and 40 are such that the push 39 engages before the push 40 comes up to the wheel, the former beginning to turn the wheel 38 and continuing to do so until it is depressed in opposition to its own elasticity, and thereby disengaged from that tooth, by the following tooth pushing it away from the tooth with which it had engaged; the push 40 then completes the required motion by the engagement of its inclined bottom with the back of a tooth opposite to it.

41 is a detent pivoted on the rod 42 which passes through the cheeks 21 of the feeder frame of the controller, and is kept in contact with the wheel 38 by a spring 43 pulling on it from a fixed point 44 on the respective cheek 21. The feeder frame is pivoted on the frame 1 by a rod 45 passed through the bottom ends of the two cheeks 21 and two lugs 46 projecting rearwardly from the frame 1, in order that it may be swung to the rear away from the machine to facilitate the connection of the leading end of a fresh controller 14 with the feeder. To further facilitate this connection the detent 41 is provided with a thumb piece 47 by which it can be disengaged from the wheel 38, and the axle 20 with a milled head 48 by which it can be rotated. The feeder frame is locked to the frame 1 in its working position by a latch 49 pivoted on the latter on a suitable fixed part of the machine. The proper degree of contact between the controller 14 and a sufficient arc of the convex surface is secured by the roller 50 carried with its axis parallel with that of the axle 20 and in the same horizontal plane, by a frame 51 pivoted upon the rod 42 and pushed up toward the said surface 22 to press the controller 14 against the latter by a spring push 52 working in one of the cheeks 21 of the feeder frame.

*Type carrier* (Figs. 5, 6 and 7.)—This is a rectangular frame 53 fast to a slide 54 about a hole therein coincident with the internal area of the said frame. The types 55 are arranged side by side within the frame 53 in rows and columns, presenting their feet normally flush with the top surface of the slide 54 and their printing faces projecting downward just below the edge of the frame 53 as shown. The normal or idle position of the type carrier is a central one, the central position of the frame being occupied by a quad or non-printing type 56, and it is this quad that stands under the printing ram when the printing mechanism is intentionally out of action, so that an impression cannot then be made. Each type body has a notch 57 in its side, all of the notches being of the same dimension and occupying a like position so that each row of type has a row of notches extending from one side of the frame 53 to the opposite one. Each of these two opposite sides has a slot 58 in it opposite the respective ends of the rows of notches 57, the bottoms of the slots 58 registering with the bottoms of the rows of notches 57 and their tops being a little lower than the tops of the rows of notches when the types are in their normal position.

59 is a bar extending through each row of notches 57 and resting by its ends upon the bottoms of the slots 58, and it is prevented from moving in the direction of its length by any suitable means such as by being bent down outside the frame 53. 60 is a bar lengthwise extending through each row of notches 57, but while a bar 59 is rectangular through its length a bar 60 has a series of convexities 61 on its top, one for each type.

62 is a spring resilient between each bar 59 and the respective bar 60. It is preferably curved with inwardly bent ends so that it may bear upon one bar near its ends and upon the middle of the other bar. The resilience of the springs 62 keeps the bars 59 and 60 in contact respectively with the tops and bottoms of the notches 57 and the slots 58, thereby holding all the type in their normal position, allowing each one to be pushed down by the printing ram, and returning it afterward. The convexities 61 perfect the contact of the printing ram with the respective types.

*Selection of a type and adjustment of the type carrier to place that type in printing position.* (Figs. 11 and 12.)—At a proper height above the convex surface described in connection with the plate 22 is the row of selecting pins 63. These must be mounted in such a way that they can engage in all the holes in the particular transverse row of the controller 14 which the latter may present to them when it is stopped on the surface 22 by the controller feeder. These pins 63 are all of the same size and are adapted to work with a reciprocating motion in suitable guides which may advantageously be holes in a transverse bar 64 held over the controller feeder by brackets 65, 65 fixed on the frame 1. The open ends of these holes are closed by a plate 66 fixed to the bar 64. Each pin 63 has an independent spring 63$^a$ to protrude the nose of it beyond the plate 66 as far as the opposite face of the controller 14, and to push it through a hole therein if there is one opposite to it, such protrusion being limited by a suitable stop such as a shoulder on the pin 63 adapted to engage with the internal face of the plate 66.

There are as many pins 63 as there are possible rows of holes in the controller 14 between the rows of feeding holes 7, less one. There will, therefore, with the controller shown in Fig. 1, be six for the spaces between the printed characters, twenty for the type carrier 53 and one to shift the paper carriage at the end of a line, or twenty-seven in all. There will be an interval in the rows of pins 63 to correspond with the unrepresented row. The head of each pin 63 has loosely connected with it the end of one arm 67 of a bell crank lever that is fulcrumed upon a transverse rod 68 carried by suitable extensions of the frame 1, the bar 64 having suitable cavities 69, see Fig. 34, to make room for the said ends. The end of the opposite arm 70 of each lever is similarly connected to the adjacent end of a rocking pin 71. The loose connections just mentioned may advantageously consist of slots in the heads of the rocking pins 63 adapted to receive the similarly shaped ends of the lever arms 67 and similar slots 72 in the pins 71 adapted to receive the suitably shaped ends of the lever arms 70. The series of pins 71 is carried in a frame 73 adapted to rock on its trunnions 74 in suitable bearings in the frame 1, all the pins 71 protruding normally for a certain distance beyond the frame 73. Opposite the protruding ends of the pins 71 there is a bar 75 carried by or forming part of a frame 76 capable of rocking on studs 77 projecting inwardly from brackets 78, 78 fast on the frame 1. This bar 75 carries a series of pins 79 standing vertically, that is to say at right angles to the plane of the rocking pins 71, and in close proximity to the free, protruding ends thereof. The frame 76 is provided with a nose 80 coöperating with a detent 81 in the form of a curved blade spring adapted to hold it in each of its terminal positions. There is a vertical pin 79 opposite each rocking pin 71 excepting the one that is connected with the hole which controls the shift of the paper carriage at the end of a line. This shift is effected by a special device presently to be described, instead of by means of a vertical pin. The absence of a vertical pin for this purpose causes a gap in the series, which divides the same into two groups. Each of the vertical pins 79 can reciprocate longitudinally and is provided with a suitable returning spring 82.

The rocking pin frame 73 is rocked by a bell crank device comprising a rock shaft 83 having fast thereon a horizontal arm 84 connected directly with said frame, and a depending arm 85, which latter has at its lower end a roll 86 riding in a cam groove 87 in the composite cam 2 above referred to. This bell crank device rocks the pin frame 73 first up then down, the downward motion thereof depressing a vertical pin 79. The upward motion of the frame coöperates with a safety device consisting of two groups of angular nosed pieces 88 hanging in line from a transverse bar 89 over the actuated position of the noses of the rocking pins 71 and from a row of pivots 90 on said bar. The raising of this safety device is intended to prevent such an accident as the following: Reference to the controller shows that there may be as few as only one character perforation on each side of the longitudinal median line of it, and there should be only one rocking pin 71 for each perforation. It may, however, happen that there may be (by accident) more than one of such pins protruded for any one perforation. Under such circumstances the safety device will come into operation, inasmuch as the pieces 88, see Figs. 4 and 12, although they can swerve far enough right and left to allow of one pin 71 being rocked as high as the eccentricity of the cam groove 87 would raise it, cannot be displaced sufficiently to allow of two such pins being raised to such a distance. If therefore two pins should be simultaneously rocked up into either group of hanging pieces, these latter will jam against each other and the bar 89 carrying them will consequently be rocked up. Now, said bar is carried on a frame 91 pivoted at 92 and is connected with the vertical pin frame 76 by a link 93, so that if the bar 89 is rocked up the frame 76 and with it all the vertical pins 79 is rocked out of the down path of the rocking pins 71, with the result that the down-stroke is rendered futile and most of the subsequent mechanisms are stopped. This will attract the noise of the attendant, who will forthwith stop the main shaft 3, retract the controller for as many transverse rows of perforations as it has overrun the printing, and also retract the paper carriage (hereinafter described) for as many characters as it has overrun the printing, restore the vertical pin frame 76 to its working position and close the clutch 5. The down-stroke of the actuated rocking pins 71 follows their upstroke immediately.

94, 94, are a pair of equal and coördinate wheels geared together by toothed portions 95, 95 of their peripheries, with their sides in a plane adjacent to and parallel with the axes of the groups of vertical pins 79. They turn about fixed axes in seatings in the machine frame, as clearly shown in Fig. 3 and receive an oscillatory motion through about a quarter of a circle from a rack 96 reciprocating in a groove 97 in the main frame and actuated by a rocking lever 98 driven by a groove 99 in the cam 2. Each wheel is fitted with pins 100 sliding lightly in guides therein and long enough to project beyond either face of the respective wheel. There are as many of these wheel pins as there are longitudinal rows of character selecting holes in the two series 9 and 10 of such holes, say nine in one and eleven in the other, the twenty wheel pins standing opposite, respectively, to the twenty vertical pins 79 that coöperate with them. Preferably, the wheel pins are circular in section and are either provided with suitable friction devices or are fitted into their holes with a sufficiently tight fit to prevent them from dropping by their own weight. Adjacent to each wheel there is a slide 101 working in a plane parallel with the respective wheels in guides in the main frame and each having a slot 102 registering with the row of wheel pins when the wheels are at rest. The two slides are respectively connected to the open frame 53 and guide 103 of the type carrier by a link 104 and a link 105 and bell crank lever 106, so that the parallel motions of the slides will move the open frame 53 and its guide in directions at right angles to each other.

When a selecting pin 63 drops into a hole in either or each of the two series 9 and 10 of character selecting holes in the controller 14, the corresponding rocking pin or pins 71 (say the latter) will be actuated. If there has been no erroneous operation, this downward rock actuates the vertical pin 79 with which register the protruded rocking pins, and these latter in turn drive the corresponding wheel pins 100 into the grooves in the two slides. The two wheels 94 are then rotated together through the proper arc, each of the wheels 94 and driven wheel pins 100 acting respectively as a crank and crank pin to move the respective slides 101 in one or the other direction according to which side of the wheel axes (which of course represent crank axes) the pins may be on, and for distances corresponding to the distances of the driven wheel pins from the respective wheel axes, the two slides imparting corresponding movements to the frame 53 and guide 54 of the type carrier.

*Paper carriage and justification.* (Figs. 2ª, 4 and 13 to 15.)—The paper carriage 107 is moved lengthwise of the machine in suitable guides 108 for succeeding characters and justification. The paper 109, or other material to be printed on, may be in the form either of a web, as shown, or of a sheet. If the latter it is held by any suitable means, but as the invention relates primarily to a high speed machine, a web is more suitable for the purpose than separate sheets. Such a web is accordingly carried by a drum 110 turning loosely on its spindle 111 in arms 112 springing from the paper carriage on one side of the machine. The web 109 is led between friction rollers 112ª to a taking away device comprising friction rollers 113 or the like carried by arms 114 situated similarly to the arms 111 but on the opposite side of the machine. The paper carriage 107 is moved just before the impression by the rack 96 that turns the co-ordinate wheels 94. This rack engages a push rod 115 at such a point in its own stroke that the motion given by the push rod to the paper carriage will be equal to the unit size of the type in the type carrier. The motion of the push rod 115 is in a direction opposite to that of the paper carriage 107 and reaches the latter through the following mechanism: A pawl 116 is mounted on the end of a rod 117 carried by a block 118 which is clamped upon the outer end of the push rod 115, said pawl actuating a ratchet wheel 119, which latter is of large diameter in order that none of the linear motion of the push rod 115 may be lost. On an axis alined with that of the ratchet wheel 119 and connected therewith by a friction clutch 121 there is a pinion 120 with which gears a rack 122 fast to the paper carriage 107 and parallel with the push rod 115. The push rod is provided with a suitable returning spring 123, and is adjustable in point of length, such adjustment being necessitated by every change of font. The friction clutch 116 interposed between the push rod 115 and the carriage rack 122 coöperates with the shaft of the carriage for a fresh line.

The justification required for the purposes of this invention resolves itself into moving the paper carriage for a greater or shorter lineal distance according to the set-way dimension of the next character to be printed. Accordingly, all the types in a font are arbitrarily divided into a given number of classes, all in the same class receiving the same set-way dimension. Say there are seven classes; the distance the paper carriage is moved by one of the above described motions of the push rod 115 will then be the proper one for each character of the narrowest set-way dimension class, and special means will be required for each of the other classes. The first part of such means consists of the series 8 of holes (above referred to under the heading of "Controller") the rows in this series being six in number as the font is assumed to be divided into seven classes. Coöperating with these six rows of holes there are six selecting levers 67, 70 and six rocking pins 71 co-acting therewith and as many vertical pins 79, but no wheel pins 100. Under the row of six vertical pins are six pawls 124, 124 of the same length and pivoted side by side on the push rod 115. The rack 96 that turns the co-ordinate wheels 95 carries, fixed thereon, a six-step piece 125, the respective steps being presented to the noses of the pawls *en echelon*. The respective hole of the series 8 in the controller 14 causes the depression of the corresponding vertical pin 79 and the rock of the nose of the corresponding pawl 124 into the path of the stepped piece 125, which gives the requisite additional movement to the paper carriage through the connections above described.

*Inking the type.* (Figs. 2 to 4.)—This is effected by an inking ribbon 126 which is fast by its ends to two spools 127, 127 both turning on parallel spindles 128, 128, one on each side of the machine. These parallel spindles are geared by means of worm wheels 129, 129 and worms 130, 130 with a transverse shaft 131 carrying a ratchet wheel 132 which is turned one tooth or more at a time by a finger 133 fast on the rack 96 said finger engaging the ratchet wheel 132 once during each complete movement of the rack. Each spool 127 is detachable from its spindle 128 and may be either fast or loose thereon, the full spool being always the loose one and the empty spool the fast one, so that the ribbon is always being wound off what was the full spool on to what was the empty one.

*Impressing a type.* (Figs. 3 and 4.)—There is a transverse shaft 134 under the paper carriage driven from the main shaft 3 at one-third the speed of the latter through the intervention of bevel gear connections such as 135. The transverse shaft 134 carries a cam 136 that has three lifts, thereby making the effective rate of the cam the same as that of the main shaft 3. The cam lifts engage a rocking arm 137 carrying an anti-friction roller 138 that is kept in contact with the cam by a spring 139. The outer end of the arm 137 is pivotally connected to a link 140 the opposite end of which is similarly connected to an arm 141 depending from a transverse rock shaft 142 that carries an upstanding arm 143 opposite to the type carrier 53. Each impression is made by a ram or depressor 144 working in a suitable guide in the machine frame 1 under the influence of a toggle joint 145 the follower rod 146 of which has one end pivoted to the middle or knee joint 147 and the other to the outer (that is the upper) end of the upstanding arm 143. The follower rod 146 is made in two pieces, one sliding in or by the side of the other to practically lengthen or shorten it for the purpose of strengthening the impression, the inner part or member of said rod being, in the example illustrated, acted upon by a spring 148 tending constantly to pull it into the outer or tubular part of the rod.

*Shift of paper at the end of a line previous to starting a fresh line.* (Figs. 2, 3 and 4.)—This involves a composite motion, the components of it being, one at right angles to the length of the line and for a distance equal to that at which the lines are to be printed from one another, and one for a distance equal to that of the last line printed, the former being imparted to the paper only and the latter to the paper and paper carriage. The paper, only, is shifted by the following means: The presentation of one hole in the respective row of holes in the controller to the corresponding selecting pin 63 effects the protrusion of the respective rocking pin 71 into the intermediate space already mentioned as intervening between the two groups of vertical pins 79 and of the hanging pieces 88. This particular rocking pin is distinguished from the other rocking pins, in Fig. 4, by the reference numeral 71ª, and its downstroke rocks a bell crank lever 149 fulcrumed on the machine frame. The particular part of this lever with which the pin 71ª engages is in the form of a slide, 150, slidable upon the arm proper of the lever 149 and is connected to the vertical pin frame 75 in order that it may be slid back out of the way when said frame is rocked up.

The taking-away rollers 113 receive and bite the paper web between them. One of these rollers has a ratchet wheel 151 pitched according to the line-to-line distance and provided with efficient detents 152 to prevent improper angular motion. The paper carriage carries a slide 153 working in guides 154 on the carriage at right angles with the taking-away rollers 113 and fitted with two fingers 155 and 156, the former to engage with the beveled side of a tooth on the ratchet wheel 151 to turn said wheel and the latter, 156, to move over the flat side of a tooth to stop the wheel. The slide 153 is reciprocated by a rocking frame 157 fulcrumed at 158 near the base of the machine and engaging by its top in a fork 159 depending from the slide 153. The top of this frame is long enough to maintain this engagement throughout the maximum motion of the paper carriage. The rocking frame 157 carries an antifriction roller 160 and is acted upon by a spring 161 tending constantly to urge it toward a three-lift cam 162 upon the transverse shaft 134 above referred to in connection with the type depressor 144. From this cam the rocking frame 157 is normally kept away by a detent 163 pivoted at 164 on the machine frame and engaging a beveled-top, spring-protruded detent 165 on the said frame. This pivoted detent is connected by a suitable link and lever device 166, 166, see Figs. 29 and 32, to the bell-crank lever 149 in such manner that the rock of the latter by the downward motion of the respective rocking pin 71ª shall disengage the pivoted detent 163 from the rocking frame 157 which is thereby rocked automatically to turn the ratchet wheel 151 of the taking-away rollers 113 for one tooth. This rock brings the roller 160 upon the frame into contact with the flat of the cam 162, the succeeding lift of which returns the slide 153 and reëngages the detent 165 of the frame with the pivoted detent 163, the latter having been returned in time by a suitably arranged spring 167.

The shift of the paper carriage begins at the same time as the shift of the paper only, but lasts longer than the reciprocation of the slide in the paper carriage. It is effected by the following means: The carriage has a rack 168 fast to it and in constant engagement with a pinion 169 loose upon a sleeve 170 upon the aforesaid transverse shaft 134 and near the pivoted detent 164. It will be noticed in Fig. 4ª that the rack 168 is shrouded on both sides to prevent the pinion 169 from becoming displaced laterally. The shaft 134 has a clutching wheel or disk 171 fast upon it near the detent 165; the latter has a slope 172 and a locking detent 173, and the adjacent face of the sleeve 170 has a stud 174 positioned so as to be engaged by the locking detent 173. The said sleeve also carries a stud 175 adapted to engage in an arcual and nearly annular slot 176 in the side face of the pinion 169. It is urged toward the pivoted detent 163 by a spring 177, so that when said detent is disengaged from the rocking frame 157 in the way above described, the spring 177 causes the sleeve to be locked with the pinion 169 and with the wheel or disk 171, thereby holding both to the shaft 134 which thereupon shifts the paper carriage into position for the commencement of a fresh line. By the time this has been accomplished, the pivoted detent 163 will have been returned into its operative position in time for the sleeve to engage the slope thereon, whereby the said sleeve is disengaged from both the wheel or disk 171 and the pinion 169. The means just described constitute a clutch particularly adapted to the exact working required of it by the present invention, and it is this capacity of it rather than its details that constitute it a part of the said invention.

The width of the right-hand margin of the printed sheet is regulated by a stop 178 standing in the shift-path of the paper carriage. The time occupied by one shift of this carriage is equal to three rotations of the main shaft 3.

*Locking the controller feeder during a shift of the paper carriage.* (Figs. 3 and 4.)— There is a lever 179, suitably fulcrumed, having one end constantly engaged in an annular groove 180 in the sleeve 170,—or, more correctly, the said groove is formed in the periphery of a cylindrical block 181 screw threaded upon the said sleeve, which block likewise has formed upon its end face the stud 175 above referred to. The opposite end of the lever 179 is adapted by the clutch closing motion of the sleeve 170 to lock down upon the connecting rod 31 that places the controller feed under the control of the cam groove 25 of the main shaft cam 2. To render this locking down possible without disengaging the connecting rod 31 from the cam, the said rod is formed in two parts which are united by a suitable cushioning device. This latter preferably takes the form of an axial bore along the upper part of the rod 31 in which the lower part thereof has a working fit, a collar 182 fast on the upper part, a collar 183 loose on the lower part between the fixed collar 182 and the cam, and held fast to the lower part by a pin (not shown) passed through and working in a slot in the upper part, and a spring 184 surrounding the latter and resilient between the two collars the strength of the spring 184 being in excess of any opposition the controller feed may offer to the cam but weaker than the cam or any part of the connection of the second collar to it.

*Disengagement of the selecting pins from the controller* is effected automatically by the return motion of the rack 96 that turns the coördinate wheels 94. As already mentioned, 67, 67 are a series of bell crank levers pivoted upon a common shaft 68 and adapted to coöperate with the selecting pins 63 and rocking pins 71. From this shaft depends loosely a swinging arm 185 the lower or free end of which rests by its own weight against a stud 186 upon the rack 96. Pivoted to the swinging arm 185 at 187 is a link 188 carrying a transverse bar 189 which extends across the arms 70 of the series of bell crank levers 69 at such a point as not to impede the drop of any of the selecting pins 63 into the selecting holes in the controller. Such drop, however, will bring the arm 70 of the respective lever or levers 69 into touch with the bar 189. It will thus be seen that each return movement of the rack 96 (that is, toward the left of Fig. 3) will, through the intervention of the lever 185, link 188 and bar 189, rock back into normal position whichever of the bell crank levers 69 may have been displaced by the selecting pin or pins 63, and by so doing restore also the said selecting pin or pins to normal position out of engagement with the controller. A like disengagement becomes necessary when the controller has to be changed, this latter disengagement, however, being effected by hand. For this purpose, there is provided a hand lever 190 on a rod 191 turning in bearings in the main frame, on which rod 191 are fast two levers 192 secured at their outer ends to the transverse bar 189, a spring or springs 193 being provided to return these parts to normal position and also to coöperate with gravity in keeping the swinging arm 185 in working connection with the rack 96. It will be understood that the hand lever 190 is loose on its pivot 192, and it is held in each of its terminal positions by means of a spring 194 fixed to the main frame and provided with two stops 195 and 196 respectively, these latter being adapted to alternatively spring into engagement with the said hand lever.

*Disengagement of wheel pins from the slides next to the coördinate wheels.* (Fig. 3).—This is effected by a transverse bar 197 carrying extensions 198 adapted to enter the slots 102 in the slides 101. This bar is carried by rocking arms 199 rocked by a lever 200 one end of which is loosely connected to an adjustable and slotted link 201 which in turn is carried by one of the arms 84 that work the rocking pin frame 73. The other end of the lever 200 is connected to a returning spring 202 on the main frame 1. When the rocking pin frame 71 is at the top of its stroke, the extensions 198 are flush with the adjacent faces of the coördinate wheels 94 and their slides 101. As the frame 73 is rocked down, the leading end of the slot (marked 203 in Fig. 3) in the link rod 201 leaves the respective end of the lever 199 and the returning spring 202 pulls the extensions 198 out of the slots 102 in the slides 101. When the extensions 198 are clear of the slides, the opposite end of the slot 203 is nearly up to the lever 200. As soon as the two wheels 94 and slides 101 are back in their normal positions, the arm 84 which carries the slotted link 201 begins its return stroke, and in due course the end of the slot 203 comes up to the lever 200 and causes it to return the extensions 198, thereby pushing the protruded wheel pins 100 out of the slides 101 and back into their respective wheels.

*Change of font.* (Figs. 3 and 13 to 15).—This is effected by changing the type carrier 53, the six step piece 125 on the rack 96 that turns the coördinate wheels, and the large diameter ratchet wheel 119 of the paper carriage feeder 122 etc.; and by adjusting the length of the push rod 115 that operates this ratchet wheel. A gage or indicator 204 is connected in any suitable way with the push rod 115 so as to be actuated in accordance with the adjustment of the latter, such gage or indicator being shown separately in Fig. 15, where it is represented as a rotatable dial having six graduations corresponding respectively with six different fonts. It is arranged in a prominent position so that the attendant may see whether the push rod 115 has been correctly adjusted to the requirements of the particular font that is to be used.

*Operation of machine.*—The power for driving the whole is transmitted from any suitable motor to the pulley 4 which is fast upon one end of the shaft 3, and on the other end of said shaft is the composite cam which imparts motion from the shaft to all the moving parts of the machine. Inasmuch however as the pulley 4 is constantly driven, and as the cam 2 will only at certain definite times be required to drive the parts that are dependent on it for motion (as will be presently explained) the shaft 3 is formed in two portions, which are connected together by the clutch 5 at times and in manner hereinafter set forth. In like manner, the operations of all the working parts are controlled by a single member, which consists of the controller 14. The operations to be thus controlled are as follows:—1, the feed of controller itself; 2, the provisions of the spaces between words in the printed line; 3, the selection and impression of the types; 4, the feed of the paper carriage, and 5, the handling of said carriage at the end of each line to begin a fresh one. For these purposes the holes in the controller are of four different kinds or values, those indicated by the reference numerals 7 being the ones that effect the feed, 8 the ones that regulate the spaces, 9 and 10 the ones that control the selection and impression of the types, and 11 the ones that control the paper carriage.

To start the machine the controller is led over the fixed convex surface 19ª, the holes 7, 7 engaged with the pins 19 on the feeding disks 18, and the cam 2 connected to power. The axle 20 of the disks 18 has the ratchet wheel 38 fast thereon. As the cam 2 rotates it oscillates the arm 26 on the sleeve 27 and with it the arm 30 on the same sleeve. This reciprocates the push rod 31, and through the intervention of the bell crank lever 32 works the slide 34. This slide carries the two pushes 39 and 40 which coöperate to rotate the ratchet 38 step by step. The push 39 reaches the ratchet in advance of the push 40 and is a considerable distance below the dead center of the teeth of same, so that by its pressure against the back face of a tooth it will give a slight turn to the ratchet. By the time the push 39 has reached its effective limit the apex of the next tooth will have reached and begun to exert a downward pressure on the upper surface of same and will thus depress the push out of engagement with the tooth. The forward movement, however, of the slide 34 continues somewhat farther and this brings the other push 40 to bear with its wedge shaped end against the back face of that tooth which is immediately opposite said push 40; and the latter by sliding with a cam-like or inclined-plane action against the tooth gives a further impulse to the ratchet. The upper face of the push 40 is flat, as is also the advance face of each tooth, and at the same time that the slide 34 completes its forward motion the flat face of the tooth comes against the flat top of the push 40, which latter thus acts as a detent preventing the ratchet from turning any farther until the slide 34 is retracted.

As soon as any type-selecting or space providing hole in the controller has come into a certain position on the top of the convex surface, that is, immediately over the slot 24 therein and below the selecting pins 63, the selecting pin or pins which is or are situated adjacent the said hole will fall into same under the influence of its or their individual spring or springs 63ª, the other selecting pins being held up in opposition to their springs, because they are unable to penetrate through the unperforated substance of the paper. Each active selecting pin during its descent into the hole will swing the particular bell crank lever 67 which is connected with it, and such lever by its other arm 70 will push forward the rocking pin 71 which is assigned to it. The frame 73 carrying the pins 71 is then rocked about its trunnions 74 by the horizontal arm 84 which is actuated at the proper moment by the depending arm 85 operated by the timed cam groove 87 in the cam 2. The upward rock of the frame 73 is a trial motion merely to determine whether the safety device 88, 89 is in a position for allowing the subsequent operations to proceed or whether it is in the position for arresting the same. The construction and operation of this safety device have already been explained in the detailed description of parts. If matters are as they should be, the upward motion of the frame 73 is followed by a downward motion of the same, whereupon the projecting ends of the protruded rocking pin 71 will strike against the end of a corresponding pin 79 of a row of such pins standing in a vertical plane in the path of the protruded ends of pins 71. The vertical pin thus actuated will push down such of the wheel pins 100 as are immediately below it, and the position of these last-named pins determines the amount and direction of movement that will be given by the rotation of the coördinate wheels 94 to the type carrier to select a type as is well understood. Such rotation of these wheels is caused by the rack 96 which is itself actuated by the groove 99 in the cam 2 through the intervention of the rocking lever 98.

The selective motions of the wheels 94 are transmitted to the open frame 53 and guide 103 of the type carrier by the slotted slides 101, with which the wheel pins 100 engage, through the intervention of the links 104 and 105 and bell crank lever 106. The type carrier having by these means been moved into type selecting position the selected type will be immediately below the ram 144 which latter will thereupon be depressed by the toggle 147 operated from the shaft 3 through the intervention of the gear connections 135, shaft 134, cam 136 thereon, rocking arm 137, link 140, depending arm 141, rock shaft 142, arm 143 and follower rod 146. The strength of the impression made by the ram 144 may be adjusted by varying the length of the follower rod 146 in manner already described. The type is inked by the ribbon 126 the spools 127 of which are rotated in a step-by-step manner by the ratchet wheel 132 on shaft 131 turned a tooth at a time by the finger 132 on the rack 96, the motion of said spools being reversed each time either of them has taken over all of the ribbon, by the other spool being made fast and the full spool loose on their respective spindles.

After each impression, that is, before the next impression, the carriage is fed by the rack 96 by means of the adjustable push rod 115, the pawl 116 on the rod 117, the ratchet wheel 119, the friction clutch 121, the pinion 120, and the rack 122 on the carriage, the amount of feed being dependent on the font employed and on the set-way dimension of the type. The first of these adjustments is effected by varying the length of the push rod 115, and the second by special means governed by the holes 8 in the controller. These holes are as many in number as the classes or widths of type less one—in the illustrated example six. The narrowest class requires no special adjustment; the others are governed respectively by the six selecting levers 67, 70 appointed for the purpose and by the corresponding rocking pins 71, vertical pins 79, pawls 124 and stepped piece 125, the steps on the last corresponding with the several set-width dimensions.

At the end of the line the paper is fed in the direction of its length and also toward the beginning of the next line: the first motion by means of one particular selecting pin 63, rocking pin 71ª, bell crank lever 149, slide 150 thereon and slide 153 on the carriage, the slide 150 being connected by means of the link and lever device 166, detent 165 and rocking frame 157 with the cam 162 on the shaft 132 so that at the proper times the slide 153 on the carriage is reciprocated to rotate the ratchet wheel 151 by means of the fingers 155 and 156. The other motion of the paper carriage for a fresh line is also effected from the shaft 134, through the intervention of the pinion 169 upon the loose sleeve 170 thereon engaging the rack 168 on the carriage, said sleeve being locked on the shaft at the proper times by the clutch 171 and detent 173 in manner already described. During these motions of the paper carriage the controller feeder is locked by the sleeve 170 which causes the lever 179 to lock down upon the connecting rod 31 that effects the controlling connection between the controller feed and the cam 2.

It will of course be understood that after each operation of any selecting pin 63 such pin is disengaged from the controller by the rack 96; also that after each operation of any wheel pin 100 such pin is disengaged from the slide 101 by means of one of the arms 84, which work the rocking frame, through the intervention of the link 201, lever 200, rocking arms 199 and extensions 198 on the transverse bar 197.

The above described cycle of operations is repeated for each line.

*General construction.*— The preferred form of construction is one in which the axes of the main shaft 3, transverse shaft 134, controller feed shaft 20, paper feed shaft 111, type case 53 and its motions, the fulcra of the bell crank levers 67 which coöperate with the selecting pins 63, and of the rocking frames 73 and 91, the coördinate wheels 94 and their slides 101, are all horizontal, and many of the terms used in the foregoing description to indicate relative positions have been influenced accordingly, but the nature of the invention is not limited in this respect.

I claim,—

1. In a justifying typewriter the combination of a set of movable types, a carrier for the material to be printed on, a plunger for impressing the types one at a time, a mechanical controller, means controlled thereby for selecting the types to be impressed, a driving shaft, a composite cam thereon, means for positively connecting said cam with said carrier, means for positively connecting said cam with said plunger so as to impress a type directly by a thrust of said plunger and a driving clutch on said shaft.

2. In a justifying typewriter the combination of a perforated controller, spaced feeding disks therefor, a shaft supporting said disks at its opposite ends and fast therewith, a stationary arch located between said disks and having a cavity, a plurality of selecting pins directed toward said cavity, there being a space between the said arch and the selecting pins through which the controller travels, a movable type carrier, and means operatively connecting said type carrier with the selecting pins to move it into type selecting position.

3. In a justifying type-writer, the combination of a controller having feeding holes adjacent its lateral edges; disks with pins on their peripheries to engage said feeding holes; a shaft having said disks fast thereon adjacent its opposite ends and having the intervening space between the disks clear; a stationary, convexly curved, supporting surface for the controller, overarching said clear part of the shaft and having a slit immediately over and parallel with said shaft; means for driving said shaft step by step; a plurality of longitudinally slidable selecting pins having one end directed toward said slit but so spaced from the supporting surface as to permit the controller to pass over the convex side of the latter; guides for said pins; a movable type-carrier; and means operatively connecting said type-carrier with the selecting pins to move it into type selecting position.

4. In a justifying typewriter the combination of a mechanical controller, means for feeding it step by step, selecting pins adapted to be controlled thereby, rocking pins adapted to coöperate with them, coördinate wheels, pins therein, means coöperating with the rocking pins for selecting a wheel pin, a movable type carrier, types therein, means for operatively connecting said type carrier with the coördinate wheels, and means for protruding a wheel pin.

5. In a justifying typewriter the combination with a mechanical controller and means for feeding it, of a movable frame, types therein, slides connected with said frame, coördinate wheels means for connecting them with the slides, means for rotating the coöordinate wheels, means for transmitting the control of the controller to the coordinate wheels to determine the degree of their respective rotation, a paper carrier, and means for impressing one of the aforesaid types.

6. In a justifying typewriter the combination of a mechanical controller, power driven means for feeding it, a movable type carrier, types, a plurality of mutually independent type selecting devices divided into two groups and including coördinate wheels, pins in each wheel, a device for preventing more than one selecting means in each group from acting at any one time, means for rotating said wheels, and means for protruding a type from the carrier.

7. In a justifying typewriter the combination of a mechanical controller, a drive shaft, a cam thereon, a feed shaft, feed disks thereon, a ratchet wheel on the feed shaft, arms fast with each other and one of them operatively connected with the cam, means for connecting the other arm to a feed disk, such means including a push rod, a bell crank, a slide and pushes for rotating said ratchet; a movable frame, types, means for selecting a type and means for protruding the selected type.

8. The combination of a controller; means for feeding it; type selecting means; a slide operatively connected with said selecting means; a type carrier connected to said slide and comprising a frame provided with a slot; slidable types in said frame, said types having notches adapted to register with said slot; a spring bar engaging said notches and said slot; and means for protruding a type from the carrier.

9. The combination of a movable type carrier; relatively slidable types; resilient means for retaining them in the carrier; a controller; means including coördinate wheels adapted to be controlled thereby to bring a selected type into printing position; means for protruding a type; and means for timing the movements of said parts with reference to each other.

10. The combination of a frame having slots; relatively slidable types in said frame having notches; a plurality of bars engaging said notches and slots, one of said bars having a series of convexities; means for moving said type carrier in directions at right angles to each other; means for controlling such movements so as to thereby select a type; a cam for protruding a type; and yielding resilient means between said bars for returning a type to normal position relatively to the carrier frame.

11. The combination of a controller provided with perforations representing whites or spaces, perforations representing characters and perforations representing shifts: a selecting pin corresponding with each of the several representations; means tending constantly to intrude said pins into the respective perforations; means for positively returning a protruded pin; a type carrier containing types; means for moving it; means controlled by said pins for selecting the movements of the type carrier, such means including a rocking-frame, means for constantly rocking it, pins therein, bell-crank levers directly engaging with the respective selecting pins and with the respective pins in said rocking frame, and connections between the last-named pins and the type carrier; and means for protruding a type.

12. The combination of selecting pins; means for actuating same; means for selecting a pin; rocking pins; bell-crank levers respectively engaging the selecting pins and directly actuated thereby for actuating a rocking pin and then returning the selecting pin to normal position; a type carrier; printing types therein; means controlled by the rocking pins for selecting a type; and means for retaining the types within the carrier.

13. The combination of selecting pins or feelers; means for controlling them; means for actuating them; bell crank levers directly engaging said selecting pins or feelers; rocking pins adapted to be actuated by said levers; means for returning a lever, such lever then returning the respective selecting pin or feeler by its engagement therewith; type-writing means; and means for positively transmitting predetermined motion thereto from said last-named pins.

14. The combination of a rocking frame; pins therein; means for longitudinally protruding a pin; means for selecting a pin; pins normally out of reach of the oscillations of the rocking pins but severally adapted to be actuated by the rock of the respective protruded pin; a movable type carrier; and means for positively transmitting selective motion thereto from the co-acting pins.

15. The combination of a rotary shaft, a cam, a rock shaft, a frame thereon, pins carried by said frame and longitudinally slidable relatively thereto, means including feelers and bell crank levers for selecting a pin and simultaneously protruding the same beyond the end of said frame, means for operatively connecting the rock shaft with the rotary shaft, a bar, pins therein respectively corresponding with the first named pins, but out of reach of any save a protruded pin, a lineally movable type carrier, types, and means severally controlled by the second named pins for selecting a type.

16. The combination of a rocking frame; pins therein; means for selecting and protruding said pins; a safety device capable as a whole of rocking and including means adapted to permit the rock of a predetermined number of protruded pins but to jam when more than that number are protruded; yielding means normally preventing said safety device from rocking; a second rocking frame; motion transmitting means for connecting it with the safety device; a movable type carrier; and means controlled by the second rocking frame for moving it into a type-selecting position.

17. The combination with a type carrier of means for moving it bodily into a type-selecting position, such means including rocking pins, means for selecting a sufficient number of them and reciprocatory pins in the path of the selected rocking pins; and means adapted to be actuated by the rocking pins for shifting the reciprocatory pins out of said path when more than the predetermined number of rocking pins are selected.

18. The combination of a controller; a shaft adapted to be rotated mechanically; a type carrier; types therein; means adapted to be actuated by said shaft for moving said type carrier bodily into a type selecting position; means controlled by said controller for governing such selection; a paper carrier; means for moving the same; and means common to all the types for separately impressing any of the types.

19. The combination of a paper carriage; means for moving it step by step; a shaft adapted to be rotated mechanically; a controller; type selecting means adapted to be controlled thereby; types; a carrier therefor; means operatively connected with said shaft to move said carrier bodily to bring the selected type into printing position; and means common to all said types for separately impressing any one thereof.

20. The combination of a type carrier; type selecting means including a rack; a controller for controlling same; means for impressing a type; a paper carrier; a push rod operatively connected with said rack; and means for transmitting motion through and from the push rod to the paper carrier.

21. The combination of a type carrier; types; means for moving said carrier into a type selecting position; a controller; a paper carriage; a push rod adapted to be actuated by a part of the type selecting means; and means including a pawl, a ratchet, a clutch, a pinion and a rack for transmitting motion from the push rod to the paper carriage.

22. The combination of a type carrier; types; means for moving it bodily into a type selecting position; a paper carriage; a spring controlled push rod operatively connected with said type selecting means; means for adjusting the length of said push rod; and means for transmitting motion from the push rod to the paper carriage.

23. The combination of a type-carrier; means for moving it bodily into a type selecting position; a paper carriage; means for feeding said carriage; a controller having perforations of different values in regard to the carriage feed; means coacting with the type-carrier moving means for so controlling said feed as to move the paper carriage a unit distance at each operation for perforations of one value; and means for so controlling said carriage feed as to cause a length of motion thereof for a distance corresponding to a plurality of units for perforations of another value, said last-named means including a stepped piece the steps on which respectively correspond with the several values.

24. The combination of a type carrier; means including coördinate wheels and pins therein for selectively moving it bodily; a controller therefor; a paper carriage; means for moving it; and means including a stepped piece for determining the lengths of movement of the carriage at successive motions; said pins being controlled by the controller.

25. The combination with a type carrier containing types of means for moving it bodily into a type selecting position; a paper carrier; means for impressing a type; an inking ribbon; spools; spindles for same; a shaft; gear connecting it with one of said spindles; a ratchet on said shaft; and a finger connected with said carrier moving means for rotating the ratchet.

26. The combination of a controller; a type carrier; types; means controlled thereby for moving said carrier bodily into a type selecting position; a controller therefor; a paper carrier; means including a cam for operating said paper carrier; an inking ribbon; means connected with the carrier-moving means for feeding said ribbon; a printing ram; and motion-transmitting means between the aforesaid cam and said ram for positively operating same.

27. The combination of a controller; a main shaft; means interposed between it and the controller for driving the latter; a type carrier; types therein; type selecting means adapted to be controlled by the controller for moving said carrier lineally; means for carrying a printing surface; a ram or impressor located on the side of the type carrier remote from the printing surface and adapted to engage a single type and protrude same separately from the carrier; and means connecting said ram or impressor with the main shaft for reciprocating it at a definite relative speed.

28. The combination of a type carrier; means for moving it bodily into a type selecting position; a main shaft; driving connections between said shaft and the carrier-moving means; an intermediate shaft; means for connecting same with the main shaft; a cam thereon having the same effective speed as the main shaft; a depressor; and driving connections between said cam and depressor.

29. The combination of a type carrier; types therein; means for selecting a type; a ram or depressor; a shaft; a cam thereon; means including a toggle, a push-rod, a two-armed lever, a link, and a rocking arm, for connecting said ram or depressor with said cam; a controller; means for driving same; and means for connecting said driving means with the aforesaid shaft.

30. The combination of a type-carrier; means for moving it bodily into a type selecting position; driving means; a depressor; means including a push rod for actuating said depressor; means for adjusting the length of the push rod; and means for establishing a predetermined time relation between the push rod and the said driving means.

31. The combination of a type carrier; types therein; means for moving it bodily into a type selecting position; means for protruding a type; a paper carrier; means for lineally moving said paper carrier bodily; and means for shifting the paper only; said carrier-moving means and paper-shifting means being so timed that they commence their operations simultaneously, but that the carrier-shifting continues after the paper shifting is completed.

32. The combination of a type carrier; means for selecting a type; means for impressing a type; a paper carrier; a shaft; means independent of the type selecting devices and including a rocking frame actuated by said shaft and a slide actuated by said frame, for feeding the paper; means for shifting the paper carrier for a fresh line; means for clutching said carrier shifting means with said shaft; and a controller adapted to control both the type-selecting devices and the paper-shifting devices.

33. The combination of a type carrier; means for moving it bodily into a type-selecting position; means for driving same; a depressor or ram; means for driving it; a paper carrier; a taking-away roller; a ratchet fast therewith; a slide having means for actuating said ratchet; a rocking frame always in operative connection with said slide; rocking means connected with the depressor drive; means for intermittently connecting the rocking frame with its rocking means; and means for controlling such connection.

34. The combination of a type carrier; type selecting means; a paper carrier; means for protruding a type; means including a roller, a ratchet, pawls, a slide, a rocking frame, a cam and a shaft, for feeding the paper; a controller; means controlled thereby for connecting the rocking frame with the cam under predetermined conditions; and means for thereafter disconnecting same.

35. The combination of a type carrier; means for selecting a type, such means including coördinate wheels and a rack for actuating same; a paper carrier; a ram or impressor; a shaft; a pinion; a clutch; means including a push rod operated by said rack for actuating said clutch; means for connecting said pinion with the shaft; and a second rack engaging with the pinion and connected with the paper carrier.

36. The combination of types; type selecting means; means for impressing a type; a paper carrier; means for feeding same; a shaft; paper feeding mechanism; means for operatively connecting the paper feeding mechanism with said shaft at predetermined times; carriage returning mechanism; and means for disconnecting the paper feed from the shaft and simultaneously connecting the carriage feeding mechanism therewith.

37. The combination of a controller; a type carrier; means for moving same bodily into a type selecting position; a paper carriage; means for feeding same; paper feeding means; a shaft; means adapted to be controlled by the controller for connecting the paper feed with the shaft; means for disconnecting same; means for returning the carriage; means coöperating with the paper feed for connecting said returning means with the shaft; and means for thereafter disconnecting same therefrom.

38. The combination of a type-carrier; means for moving it bodily into a type selecting position; a printing ram; a paper carriage; means for shifting it; paper feeding means; a shaft, a clutch; means including a pivoted detent for engaging the clutch with the shaft and with the paper feed; means for transferring the engagement of the clutch from the paper feed to the carriage shifting means; a perforated controller; and means sensitive thereto for timing the action of said clutch.

39. The combination of a constantly moving shaft; a type carrier; a paper carrier; a controller; means for feeding said controller; means for connecting said feeding means with said shaft to drive the former; means controlled by said controller for moving the type carrier bodily into type selecting position; means also controlled by said controller for shifting the paper carrier; means for locking a part of said connecting means so as to arrest the controller feed during such shift; and means for permitting another part of said connecting means to continue to move with the aforesaid shaft.

40. The combination of a controller; means for feeding it; a type carrier; type selecting means for moving said carrier; a paper carrier; means for shifting it; and means including a lever connected with said shifting means for locking the controller feed.

41. The combination of types; type selecting means; means for impressing a type; a paper carriage; a shaft; means including a sleeve on said shaft and clutch members for shifting said carriage; a controller; means including a main shaft, a cam and a connecting rod, for feeding said controller; and means including a lever connected with said sleeve adapted to lock said connecting rod.

42. The combination with types; selecting means therefor and impressing means; of a paper carrier; means for shifting it; a controller; a cam; a connecting rod formed in a plurality of parts; a yielding connection between said parts; means connected with said rod for feeding the controller; and locking means connected with the carriage shifting means for engaging one of the parts of the connecting rod.

43. The combination with a type carrier of means including a controller, selecting pins, intermediate pins and a rack for moving said carrier into a type selecting position; bell crank levers respectively connecting the selecting pins with the intermediate pins; a movable device adapted to contact with a lever; and means operatively connecting said contacting device with the rack.

44. The combination of selecting pins; means for protruding a selecting pin; a controller therefor; a type carrier; means including a rack bar for moving said carrier; means common to all the selecting pins for returning a selecting pin; and means loosely engaging said rack bar for connecting said returning means with the reciprocating member.

45. The combination of a type carrier; means including a member movable backward and forward for moving it; selecting pins; a controller; means for actuating a pin; means for returning a pin; means for causing said returning means to follow said member on one motion thereof; and means for engaging said returning means with said member on its other motion.

46. The combination of a type carrier; means including a wheel, pins slidable therein, and a slotted slide, for moving said carrier; means for protruding a wheel pin to engage the slide; and means for thereafter disengaging the pin from the slide.

47. The combination of a movable type carrier; a wheel; pins slidable therein; a slotted slide; means including a rocking frame for engaging a wheel pin in the slide; a bar for disengaging said pin; a rocking lever connected with said bar; and a yielding or lost motion connection between said lever and the rocking frame.

48. The combination of a movable type carrier; a wheel; a rocking frame; a slide; means for engaging said wheel with the slide; a bar for disengaging said wheel; means connected with the rocking frame and adapted on one motion of said frame to operate said bar and on the other motion thereof to move idly; and means independent of the frame for returning the bar.

49. The combination of a type carrier; a controller; a rocking frame controlled thereby; connections between said frame and the carrier for moving the latter bodily into and out of a type selecting position; and means for thereafter severing said connection.

50. The combination with a type carrier, a rocking frame and connections between them for bodily moving the carrier; of means for severing such connection, said means comprising a link having a slot, a rocking lever loosely engaging in said slot, an arm, means independent of the link for moving the lever and bar in one direction, and extensions on said bar adapted on its other motion to contact with one of the aforesaid connections.

51. The combination of a type carrier; means for moving it into and out of a type selecting position, such means including a plurality of coördinate wheels, pins in each wheel, slotted slides, and means for selecting a pin in the respective wheel and protruding it into engagement with the respective slide; and means for thereafter disengaging a pin from the respective slide.

52. The combination of a controller; a type carrier; means controlled by said controller for moving said carrier bodily into a type selecting position; a paper carriage; means for feeding it; means for adjusting the motions of the type carrier to allow of a change of font; and means for correspondingly adjusting the carriage feed.

53. The combination of a type-carrier; means including a rack and a stepped piece thereon for moving said type-carrier into a type selecting position, said stepped piece being removable to allow of the substitution of a different one; a paper carriage; means including a removable ratchet wheel and actuating mechanism therefor for feeding said carriage; and means for adjusting the amount of motion transmitted to the ratchet wheel by its actuating mechanism for adjusting the feed of said paper carriage.

54. The combination of a type carrier; means for moving it into a type selecting position; means for varying such movements to allow of a change of font, a paper carriage; means including a push rod and a plurality of interchangeable parts for feeding said carriage; and means for permitting adjustment of the effective length of said push rod, so that on substituting one of such interchangeable parts for another, the amount of movement transmitted thereto by the push rod will be varied.

55. The combination of means adapted to carry a font of type; means for moving such carrying means to select a type; means for adjusting such movements to allow of a change of font; a paper carriage; means including a push rod for feeding it; means for adjusting the effective length of said rod for adjusting such feed; and means connected with said push rod and operated thereby for indicating the amount of the adjustment.

56. In a justifying typewriter the combination of a main shaft; a transverse shaft; a controller; a feed shaft therefor; means for feeding paper; a lineally movable type carrier; independently movable types therein; and means including selecting pins, bell crank levers, rocking frames, coördinate wheels and slides for lineally moving said type carrier.

In witness whereof I have hereunto set my hand in the presence of two witnesses.

WOOLMAN GIBSON WHITE.

Witnesses:
S. STUART POOLE,
DAVID HENRY MEAD.